United States Patent
Hosseini et al.

(10) Patent No.: US 12,262,368 B2
(45) Date of Patent: Mar. 25, 2025

(54) TIMELINE FOR SIDELINK INTER-USER EQUIPMENT COORDINATION

(71) Applicant: QUALCOMM Incorporated, San Diego, CA (US)

(72) Inventors: Seyedkianoush Hosseini, San Diego, CA (US); Tugcan Aktas, La Jolla, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/444,531

(22) Filed: Aug. 5, 2021

(65) Prior Publication Data
US 2022/0046664 A1 Feb. 10, 2022

Related U.S. Application Data

(60) Provisional application No. 62/706,304, filed on Aug. 7, 2020.

(51) Int. Cl.
*H04W 72/1263* (2023.01)
*H04W 28/26* (2009.01)
*H04W 72/02* (2009.01)

(52) U.S. Cl.
CPC ....... *H04W 72/1263* (2013.01); *H04W 28/26* (2013.01); *H04W 72/02* (2013.01)

(58) Field of Classification Search
CPC . H04W 72/1263; H04W 72/02; H04W 28/26; H04W 76/14; H04W 72/25
See application file for complete search history.

(56) References Cited

U.S. PATENT DOCUMENTS

2020/0275458 A1* 8/2020 Khoryaev ............. H04W 72/12
2021/0227602 A1* 7/2021 Li ........................ H04W 76/14
(Continued)

OTHER PUBLICATIONS

Huawei., et al., "On Sidelink Enhancement", 3GPP Draft, R1-2004602, 3GPP TSG RAN WG1 Meeting #101-e, 3rd Generation Partnership Project (3GPP), Mobile Competence Centre, 650, Route Des Lucioles, F-06921 Sophia-Antipolis Cedex, France, vol. RAN WG1. No. E-meeting, May 25, 2020-Jun. 5, 2020, May 16, 2020 (May 16, 2020), XP051886317, 3 Pages, Retrieved from the Internet: URL:https://ftp.3gpp.org/tsg_ran/WG1_RL1/TSGR1_101-e/Docs/R1-2004602.zip, R1-2004602.docx [retrieved on May 16, 2020], The whole document, Paragraph 1 Introduction, p. 1, Paragraph 3.2 Resource Allocation to Enhance Reliability and Reduce Latency, p. 2,-p. 3.
(Continued)

*Primary Examiner* — Ricardo H Castaneyra
(74) *Attorney, Agent, or Firm* — Harrity & Harrity LLP / Qualcomm

(57) ABSTRACT

Various aspects of the present disclosure generally relate to wireless communication. In some aspects, a first user equipment (UE) may select a set of available sidelink resources in a selection window for communication by a second UE. The first UE may transmit, to the second UE, an inter-UE coordination message that indicates inter-UE coordination information identifying the set of available sidelink resources, wherein the selection window is of a length different than a length of a resource selection window of the first UE. Numerous other aspects are provided.

30 Claims, 17 Drawing Sheets

(56) References Cited

U.S. PATENT DOCUMENTS

| | | | |
|---|---|---|---|
| 2021/0250954 A1* | 8/2021 | Li | H04W 72/56 |
| 2021/0282174 A1* | 9/2021 | Cao | H04L 5/0091 |
| 2021/0337519 A1* | 10/2021 | Farag | H04L 5/0053 |
| 2023/0028098 A1* | 1/2023 | Lin | H04W 24/08 |
| 2023/0039093 A1* | 2/2023 | Xiang | H04W 72/0446 |

OTHER PUBLICATIONS

International Search Report and Written Opinion—PCT/US2021/071129—ISA/EPO—Dec. 1, 2021.

* cited by examiner

TIMELINE FOR SIDELINK INTER-USER EQUIPMENT COORDINATION

CROSS-REFERENCE TO RELATED APPLICATION

This patent application claims priority to U.S. Provisional Patent Application No. 62/706,304, filed on Aug. 7, 2020, entitled "TIMELINE FOR SIDELINK INTER-USER EQUIPMENT COORDINATION," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for inter-user equipment (UE) coordination.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a first user equipment (UE) includes selecting a set of available sidelink resources in a selection window for communication by a second UE. In some aspects, the method includes transmitting, to the second UE, an inter-UE coordination message that indicates inter-UE coordination information identifying the set of available sidelink resources, wherein the selection window is of a length different than a length of a resource selection window of the first UE.

In some aspects, a method of wireless communication performed by a base station includes determining that a first UE is to select a set of available sidelink resources for a second UE in a selection window. In some aspects, the method includes transmitting a request for the first UE to select the set of available sidelink resources for the second UE in a selection window, wherein the selection window is of a length different than a length of a resource selection window of the first UE.

In some aspects, a method of wireless communication performed by a first UE includes receiving, from a second UE, an inter-UE coordination message that indicates inter-UE coordination information identifying a set of available sidelink resources in a selection window for communication by the first UE. In some aspects, the method includes performing a communication on a sidelink resource of the set of available sidelink resources based at least in part on a determination of a location of the selection window.

In some aspects, an apparatus for wireless communication at a first UE includes a memory and one or more processors coupled to the memory. The one or more processors may be configured to select a set of available sidelink resources in a selection window for communication by a second UE. The one or more processors may be configured to transmit, to the second UE, an inter-UE coordination message that indicates inter-UE coordination information identifying the set of available sidelink resources, wherein the selection window is of a length different than a length of a resource selection window of the first UE.

In some aspects, an apparatus for wireless communication at a base station includes a memory and one or more processors coupled to the memory. The one or more processors may be configured to determine that a first UE is to select a set of available sidelink resources for a second UE in a selection window. The one or more processors may be configured to transmit a request for the first UE to select the set of available sidelink resources for the second UE in a selection window, wherein the selection window is of a length different than a length of a resource selection window of the first UE.

In some aspects, an apparatus for wireless communication at a first UE includes a memory and one or more processors coupled to the memory. The one or more processors may be configured to receive, from a second UE, an inter-UE coordination message that indicates inter-UE coordination information identifying a set of available sidelink resources in a selection window for communication by the first UE. The one or more processors may be configured to perform a communication on a sidelink resource of the set of available sidelink resources based at least in part on a determination of a location of the selection window.

In some aspects, a non-transitory computer-readable medium storing a set of instructions for wireless communication includes one or more instructions that, when executed by one or more processors of a first UE, cause the first UE to select a set of available sidelink resources in a selection window for communication by a second UE. The one or more instructions, when executed by one or more processors of the first UE, cause the first UE to transmit, to the second UE, an inter-UE coordination message that indicates inter-UE coordination information identifying the set of available sidelink resources, wherein the selection window is of a length different than a length of a resource selection window of the first UE.

In some aspects, a non-transitory computer-readable medium storing a set of instructions for wireless communication includes one or more instructions that, when executed by one or more processors of a base station, cause the base station to determine that a first UE is to select a set of available sidelink resources for a second UE in a selection window; and transmit a request for the first UE to select the set of available sidelink resources for the second UE in a selection window, wherein the selection window is of a length different than a length of a resource selection window of the first UE.

In some aspects, a non-transitory computer-readable medium storing a set of instructions for wireless communication includes one or more instructions that, when executed by one or more processors of a first UE, cause the first UE to receive, from a second UE, an inter-UE coordination message that indicates inter-UE coordination information identifying a set of available sidelink resources in a selection window for communication by the first UE. The one or more instructions, when executed by one or more processors of the first UE, cause the first UE to perform a communication on a sidelink resource of the set of available sidelink resources based at least in part on a determination of a location of the selection window.

In some aspects, an apparatus for wireless communication includes means for selecting a set of available sidelink resources in a selection window for communication by a second UE. In some aspects, the apparatus includes means for transmitting, to the second UE, an inter-UE coordination message that indicates inter-UE coordination information identifying the set of available sidelink resources, wherein the selection window is of a length different than a length of a resource selection window of the first UE.

In some aspects, an apparatus for wireless communication includes means for determining that a first UE is to select a set of available sidelink resources for a second UE in a selection window. In some aspects, the apparatus includes means for transmitting a request for the first UE to select the set of available sidelink resources for the second UE in a selection window, wherein the selection window is of a length different than a length of a resource selection window of the first UE.

In some aspects, an apparatus for wireless communication includes means for receiving, from a second UE, an inter-UE coordination message that indicates inter-UE coordination information identifying a set of available sidelink resources in a selection window for communication by the first UE. In some aspects, the apparatus includes means for performing a communication on a sidelink resource of the set of available sidelink resources based at least in part on a determination of a location of the selection window.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
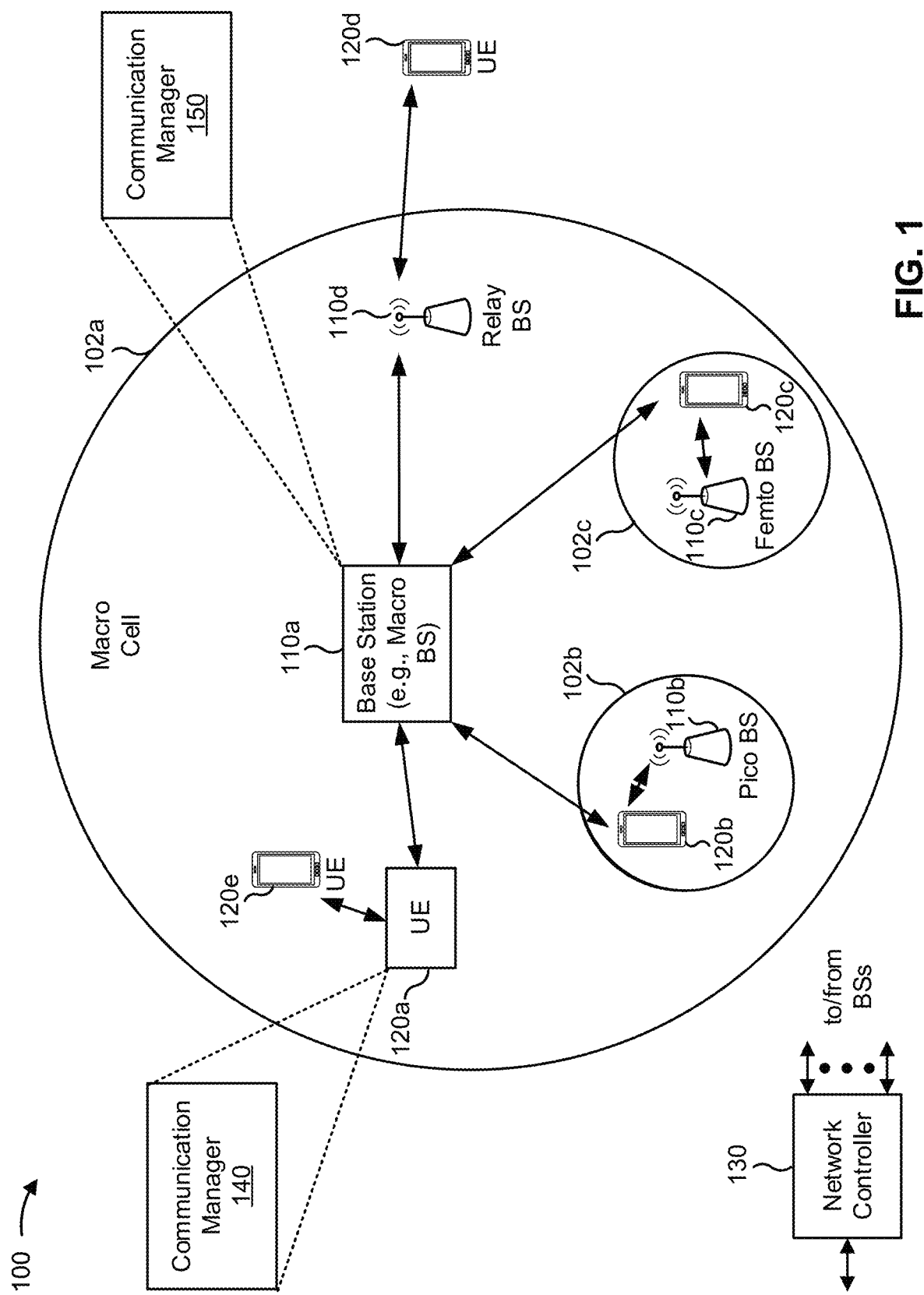
FIG. 1 is a diagram illustrating an example of a wireless network, in accordance with the present disclosure.

Inter-user equipment (UE) coordination enables a first UE to perform resource selection in order to facilitate sidelink communications by a second UE. For example, the second UE, or a base station, may transmit an inter-UE coordination request that the first UE perform an inter-UE coordination operation. The first UE may identify a set of resources in a selection window based at least in part on receiving the inter-UE coordination request and based at least in part on a sensing operation, and may transmit an inter-UE coordination message to the second UE indicating the set of resources. The set of resources can be available resources and/or unavailable resources. The second UE may select a resource based at least in part on the set of resources and may communicate on the selected resource.

If the first UE is triggered to generate an inter-UE coordination message, then the first UE may not be permitted to select or modify a size of the selection window, since selecting the size of the selection window at the first UE may lead to ambiguity at the second UE as to how to map the inter-UE coordination message to sidelink resources. Similarly, if there is ambiguity as to a start of the selection window (e.g., if the first UE determines a location of the selection window without informing the second UE of the location of the selection window), then ambiguity as to how to map the inter-UE coordination message to sidelink resources may arise. Furthermore, if the first UE uses a resource selection window of the first UE as the selection window for inter-UE coordination, then these ambiguities may be exacerbated, as not all UEs may use the same resource selection window. Such ambiguities may lead to improper selection of sidelink resources and thus inefficient utilization of sidelink resources.

Some techniques and apparatuses described herein provide timelines for selection windows and inter-UE coordination messages for inter-UE coordination. For example, in some aspects, a selection window for inter-UE coordination may be independent of a resource selection window of a UE that is to select the resources for the inter-UE coordination. For example, the selection window for inter-UE coordination may be associated with a fixed size, a configurable size, and/or the like. As another example, the selection window for inter-UE coordination may be associated with a defined time gap from an end of a channel that carries the inter-UE coordination message. For example, the defined time gap may be a fixed gap, a configurable gap, and/or the like. As yet another example, techniques and apparatuses described herein may provide a timeline for an inter-UE coordination message, such as relative to an end of a channel carrying an inter-UE coordination request or relative to a time at which a UE determines to select resources for inter-UE coordination. By defining a timeline for inter-UE coordination, ambiguity in resource selection and indication is reduced, thereby improving utilization of sidelink resources.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with UEs and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a communication manager 140. As described in more detail elsewhere herein, the communication manager 140 may select a set of sidelink resources in a selection window for communication by a second UE. The communication manager 140 may also transmit, to the second UE, an inter-UE coordination message that indicates inter-UE coordination information identifying the set of sidelink resources, wherein the selection window is independent of a resource selection window of the UE 120. In some aspects, the communication manager 140 may receive, from a second UE, an inter-UE coordination message that indicates inter-UE coordination information identifying a set of sidelink resources in a selection window for communication by the UE 120. The communication manager 140 may perform a communication on a sidelink resource of the set of sidelink resources based at least in part on a determination of a location of the selection window. Additionally, or alternatively, the communication manager 140 may perform one or more other operations described herein.

In some aspects, the base station 110 may include a communication manager 150. As described in more detail elsewhere herein, the communication manager 150 may determine that a first UE is to select a set of sidelink resources for a second UE in a selection window. The communication manager 150 may also transmit a request for the first UE to select the set of sidelink resources for the second UE in a selection window, wherein the selection window is of a length different than a length of a resource selection window of the first UE. Additionally, or alternatively, the communication manager 150 may perform one or more other operations described herein.

As indicated above, FIG. 1 is provided merely as an example. Other examples may differ from what is described with regard to FIG. 1.

Figure 2:
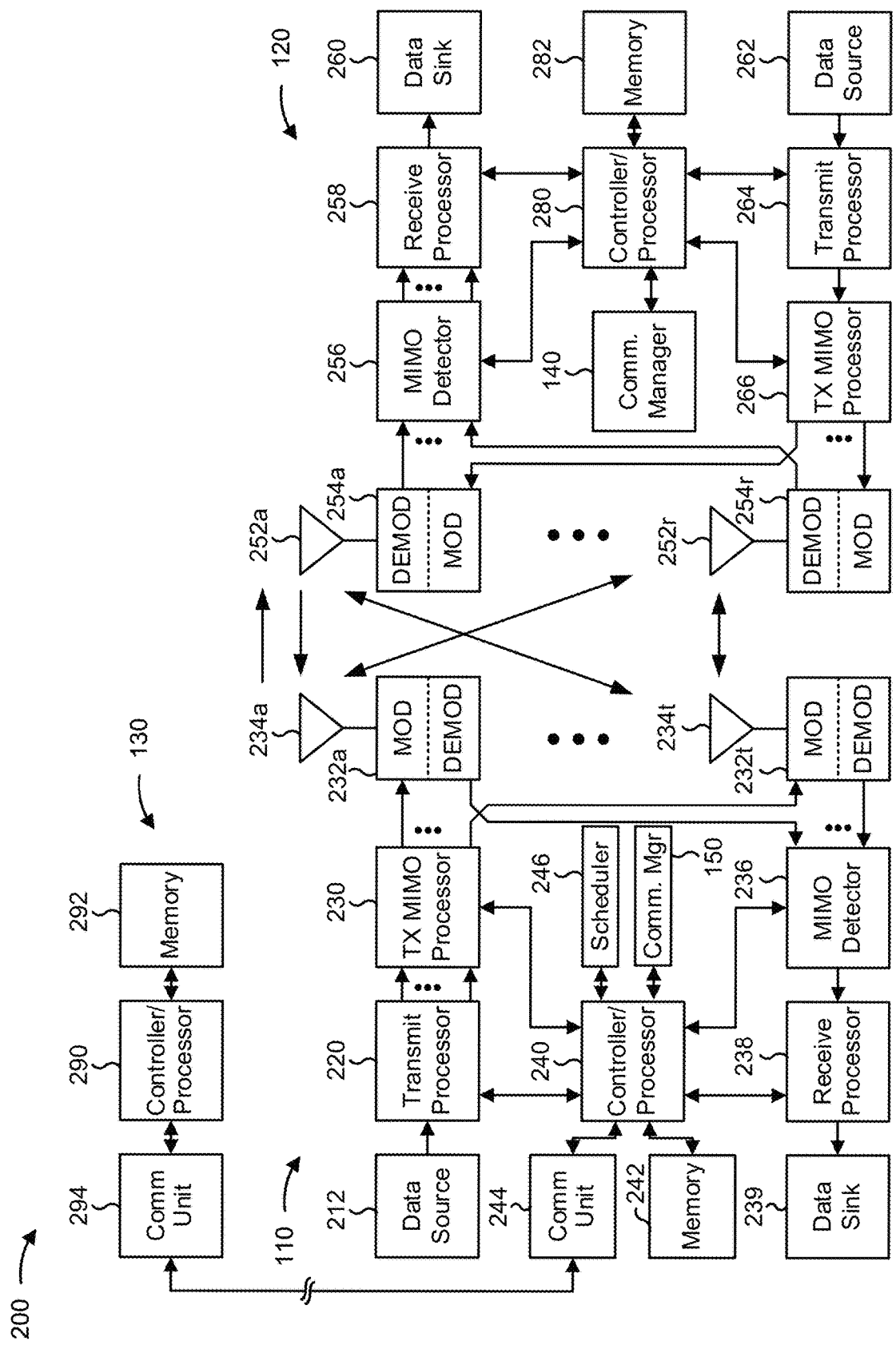
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The controller/processor 280 may provide, for UE 120, means for determining, identifying, or selecting, among other examples, such as using a determination circuit, an identification circuit, a selection circuit, and/or the like. The receive processor 258 may provide, for UE 120, means for receiving data or control information, among other examples, from, for example, BS 110. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. The transmit processor 264 may provide, for UE 120, means for transmitting data or control information, among other examples, to, for example, BS 110. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide, for BS 110, means for receiving data or control information, among other examples, from, for example, UE 120. Receive processor 238 may provide the decoded data to a data sink 239 and the decoded control information to controller/processor 240. The controller/processor 240 may provide means for, for example, determining, selecting, identifying, or detecting, among other examples. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with inter-UE coordination, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, the UE 120 may include means for selecting (e.g., using antenna 252, DEMOD 254, MIMO detector 256, receive processor 258, controller/processor 280, and/or the like) a set of sidelink resources in a selection window for communication by a second UE, wherein the selection window is of a length different than a length of a resource selection window of the first UE; means for transmitting (e.g., using controller/processor 280, transmit processor 264, TX MIMO processor 266, MOD 254, antenna 252, and/or the like), to the second UE, an inter-UE coordination message that indicates inter-UE coordination information identifying the set of sidelink resources; means for receiving (e.g., using antenna 252, DEMOD 254, MIMO detector 256, receive processor 258, controller/processor 280, and/or the like), from a second UE, an inter-UE coordination message that indicates inter-UE coordination information identifying a set of sidelink resources in a selection window for communication by the first UE; means for (e.g., using controller/processor 280, transmit processor 264, TX MIMO processor 266, MOD 254, antenna 252, and/or the like) performing a communication on a sidelink resource of the set of sidelink resources based at least in part on a determination of a location of the selection window; and/or the like. Additionally, or alternatively, the UE 120 may include means for performing one or more other operations described herein. In some aspects, such means may include the communication manager 140. Additionally, or alternatively, such means may include one or more other components of the UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, the base station 110 may include means for determining (e.g., using antenna 234, DEMOD 232, MIMO detector 236, receive processor 238, controller/processor 240, and/or the like) that a UE is to select a set of sidelink resources for a second UE in a selection window; means for transmitting (e.g., using controller/processor 240, transmit processor 220, TX MIMO processor 230, MOD 232, antenna 234, and/or the like) a request for the first UE to select the set of sidelink resources for the second UE in a selection window, wherein the selection window is of a length different than a length of a resource selection window of the first UE; and/or the like. Additionally, or alternatively, the base station 110 may include means for performing one or more other operations described herein. In some aspects, such means may include the communication manager 150. In some aspects, such means may include one or more other components of the base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3:
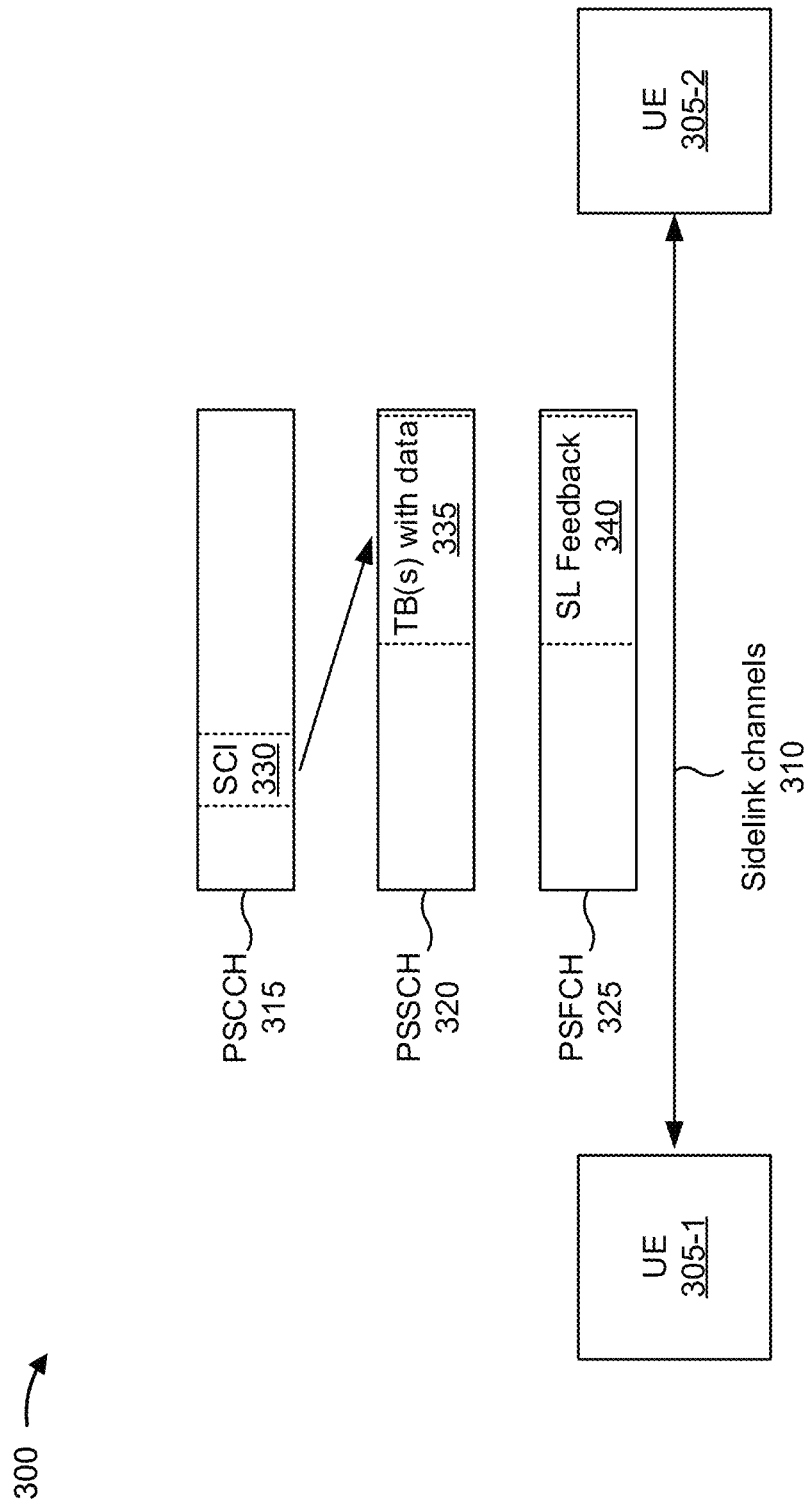
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-person (V2P) communications, and/or the like), mesh networking, and/or the like. In some aspects, the UEs 305 (e.g., UE 305-1 and/or UE 305-2) may be similar to one or more other UEs described elsewhere herein, such as UE 120. In some aspects, the one or more sidelink channels 310 may use a ProSe Sidelink (PC5) interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
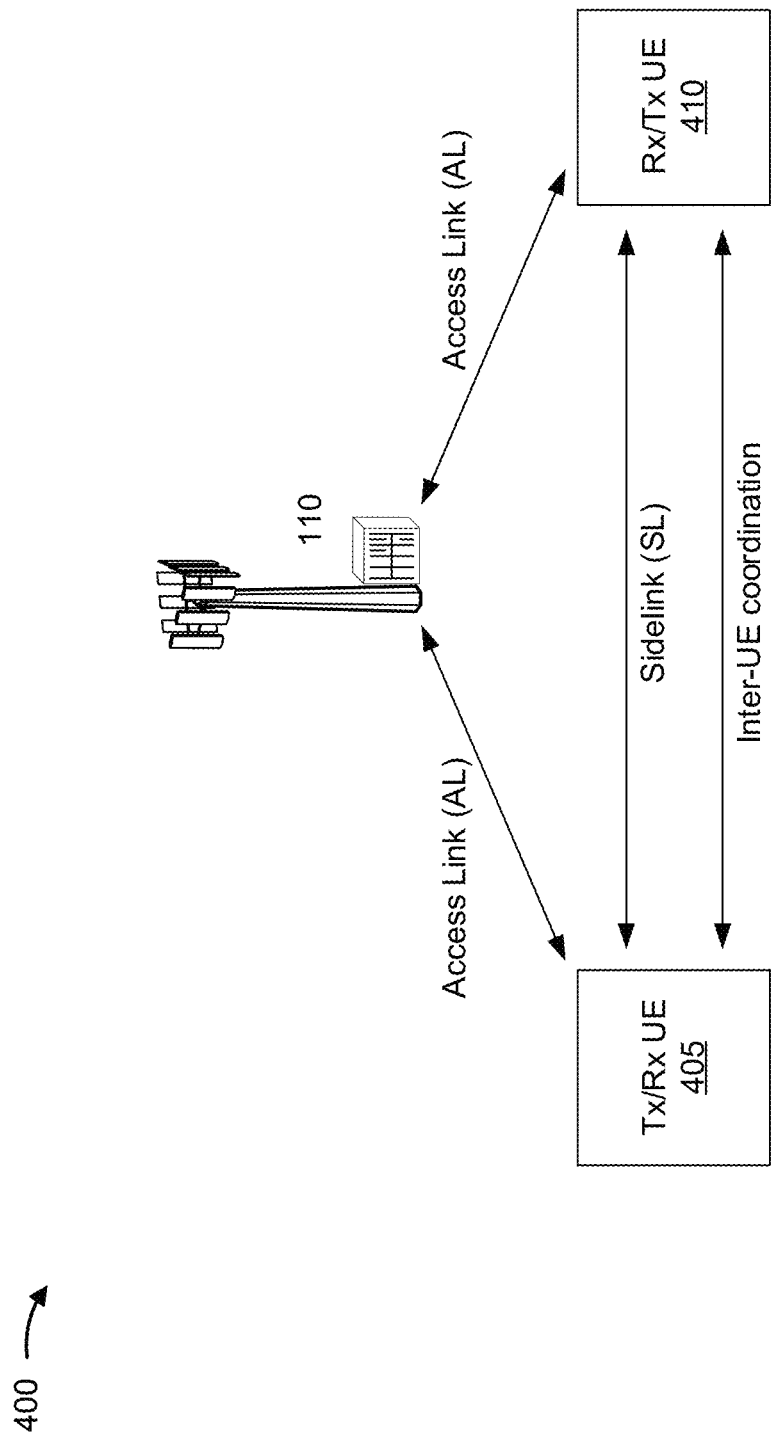
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may be similar to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
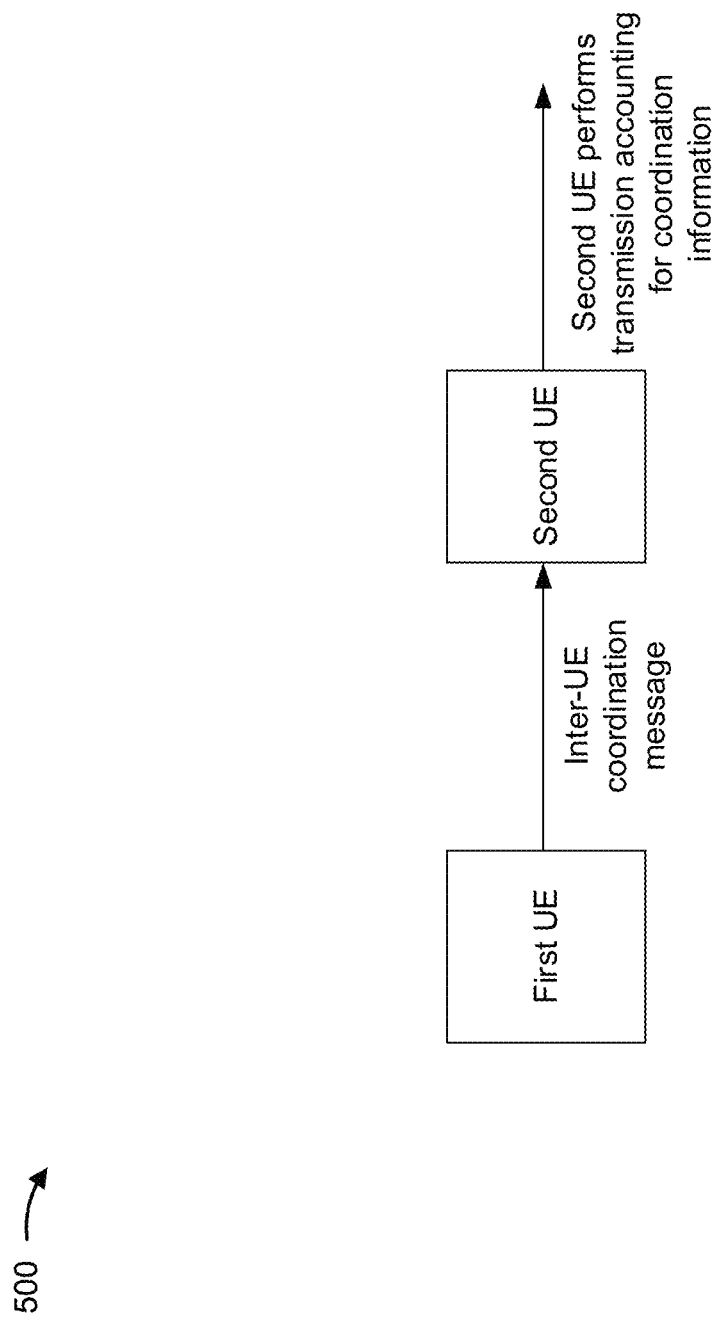
FIG. 5 is a diagram illustrating an example of inter-UE coordination signaling, in accordance with the present disclosure.

FIG. 5 is a diagram illustrating an example 500 of inter-UE coordination signaling, in accordance with the present disclosure.

In example 500, a first UE (e.g., UE 120a) exchanges inter-UE coordination signaling with a second UE (e.g., UE 120e). The first UE and the second UE may operate in an in-coverage mode, a partial coverage mode, an out-of-coverage mode, and/or the like. For example, the first UE may determine a set of sidelink resources available for a resource allocation. As another example, the first UE may determine a set of sidelink resources that are unavailable for a resource allocation. The first UE may determine the set of sidelink resources based at least in part on determining that the set of sidelink resources are to be selected, or based at least in part on a request, referred to herein as an inter-UE coordination request, received from the second UE or a base station. In some aspects, the first UE may determine the set of sidelink resources based at least in part on a sensing operation, which may be performed before receiving an inter-UE coordination request or after receiving the inter-UE coordination request. The first UE may transmit information indicating the set of sidelink resources to the second UE via inter-UE coordination signaling (shown as a coordination message, and referred to in some aspects as an inter-UE coordination message). In some aspects, the first UE may transmit information indicating the set of sidelink resources using an NR sidelink resource allocation mode 2. In the NR sidelink resource allocation mode 2, resource allocation is handled by UEs (e.g., in comparison to an NR sidelink resource allocation mode 1, in which resource allocation is handled by a scheduling entity such as a base station). The second UE may select a sidelink resource for a transmission from the second UE based at least in part on the set of sidelink resources received from the first UE. As shown, the second UE may perform the transmission accounting for the coordination information (e.g., via a sidelink resource indicated by the inter-UE coordination message, avoiding an unavailable sidelink resource, and/or the like). Inter-UE coordination signaling related to resource allocation may reduce collisions between the first UE and the second UE. Inter-UE coordination signaling related to resource allocation may reduce a power consumption for the first UE and/or the second UE.

As indicated above, FIG. 5 is provided as an example. Other examples may differ from what is described with respect to FIG. 5.

Figure 6:
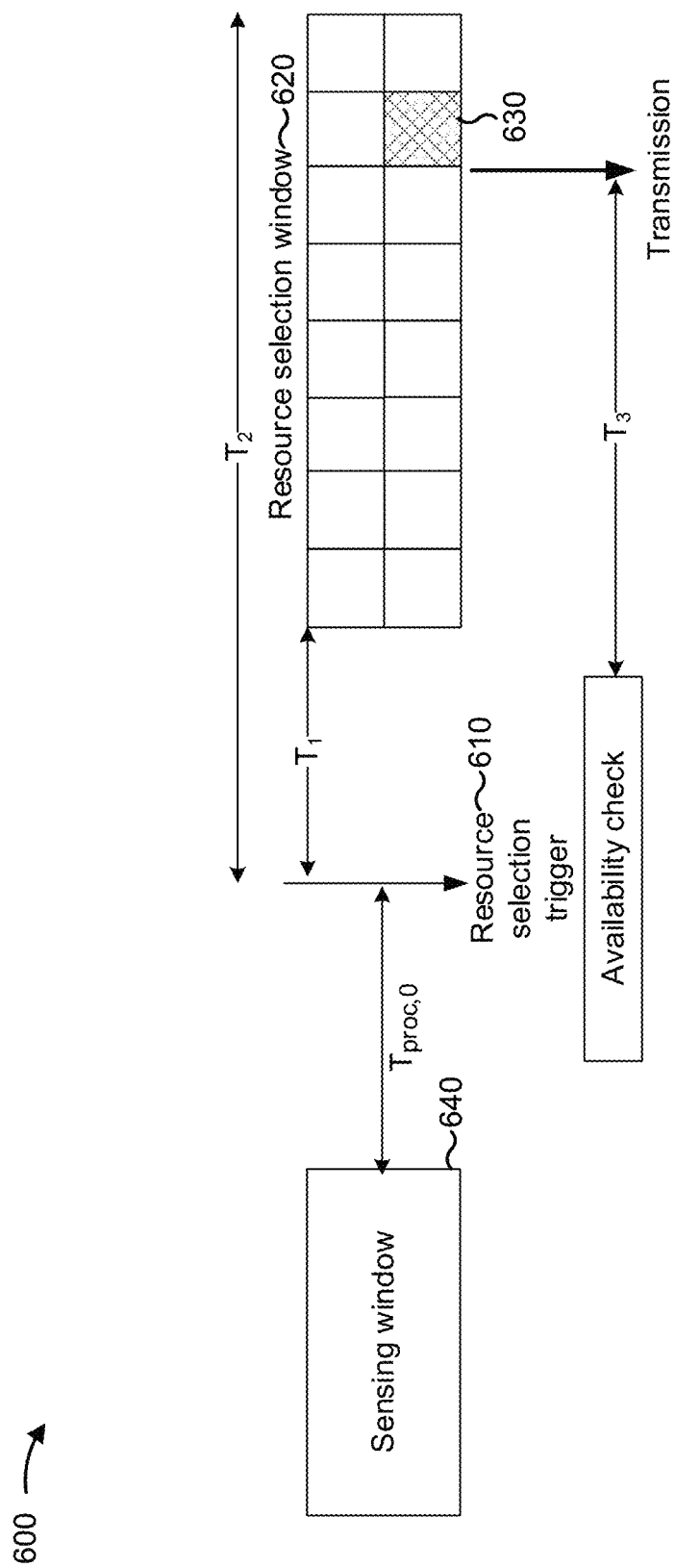
FIG. 6 is a diagram illustrating an example of NR sidelink resource allocation mode 2, in accordance with the present disclosure.

FIG. 6 is a diagram illustrating an example 600 of NR sidelink resource allocation mode 2, in accordance with the present disclosure. The operations of example 600 may be performed by a UE, such as UE 120, UE 305, or UE 405.

As shown by reference number 610, the UE may receive or determine a resource selection trigger. Accordingly, the UE may select a resource in a resource selection window. The resource selection window is shown by reference number 620, and the selected resource is shown by reference number 630. The UE may select the resource in the resource selection window based at least in part on a past sensing operation, performed in a sensing window shown by reference number 640. For example, the UE may perform sensing of sidelink resources, and may use sensing information regarding the sidelink resources to select resources in the resource selection window. As used herein, "resource selection window" refers to a window in which a UE selects resources for communication by the UE, whereas "selection window" refers to a window in which a UE selects resources for communication by another UE, such as for inter-UE coordination operations.

The resource selection window may be separated from the trigger for resource selection by at least a time $T_1$. In some aspects, $T_1$ may be determined by the UE, or may be up to UE implementation. $T_1$ may be at least a minimum length $T_{1,\ min}$ and at most a length $T\_proc_1$. The resource selection window may be associated with a length $T_2$, which in example 600 is defined relative to the trigger for resource selection. $T_1$ may be at least a minimum length $T_{2,\ min}$ and at most a remaining packet delay budget (PDB) of a communication to be transmitted on the selected resource.

In some aspects, the UE may perform an availability check before transmitting on a selected resource. For example, the UE may monitor for SCI relating to the selected resource to determine whether the selected resource has been reserved for another communication. The UE may transmit on the selected resource if no SCI relating to the selected resource is detected, or if no SCI relating to the selected resource and preempting the UE's communication on the selected resource is detected. The availability check may be based at least in part on a time gap $T_3$.

In some aspects, a UE selecting a set of sidelink resources for an inter-UE coordination operation may use a resource selection technique similar to the one described in example 600. For example, the UE may select resources from a selection window (similar to the resource selection window shown by reference number 620) that is separated from a trigger for the inter-UE coordination operation (e.g., the trigger shown by reference number 610) by $T_1$. However, if the determination of $T_1$ and a length of the selection window are up to the UE (e.g., without input from a requesting UE or without transmitting information to the requesting UE indicating $T_1$ or the length of the selection window), then there may be ambiguity as to the location of the selection window, meaning that an inter-UE coordination message may be ambiguous with regard to identities of the set of selected resources. Furthermore, the processing capabilities of the requesting UE may not be accommodated by some values of $T_1$, thus leading to dropped traffic and errors at the requesting UE. Some techniques and apparatuses described herein provide values of $T_1$ and a length of a selection window that are fixed or are known to the UE and a requesting UE, thereby eliminating ambiguity as to locations of selected resources in the selection window.

As indicated above, FIG. 6 is provided as an example. Other examples may differ from what is described with regard to FIG. 6.

Figure 7:
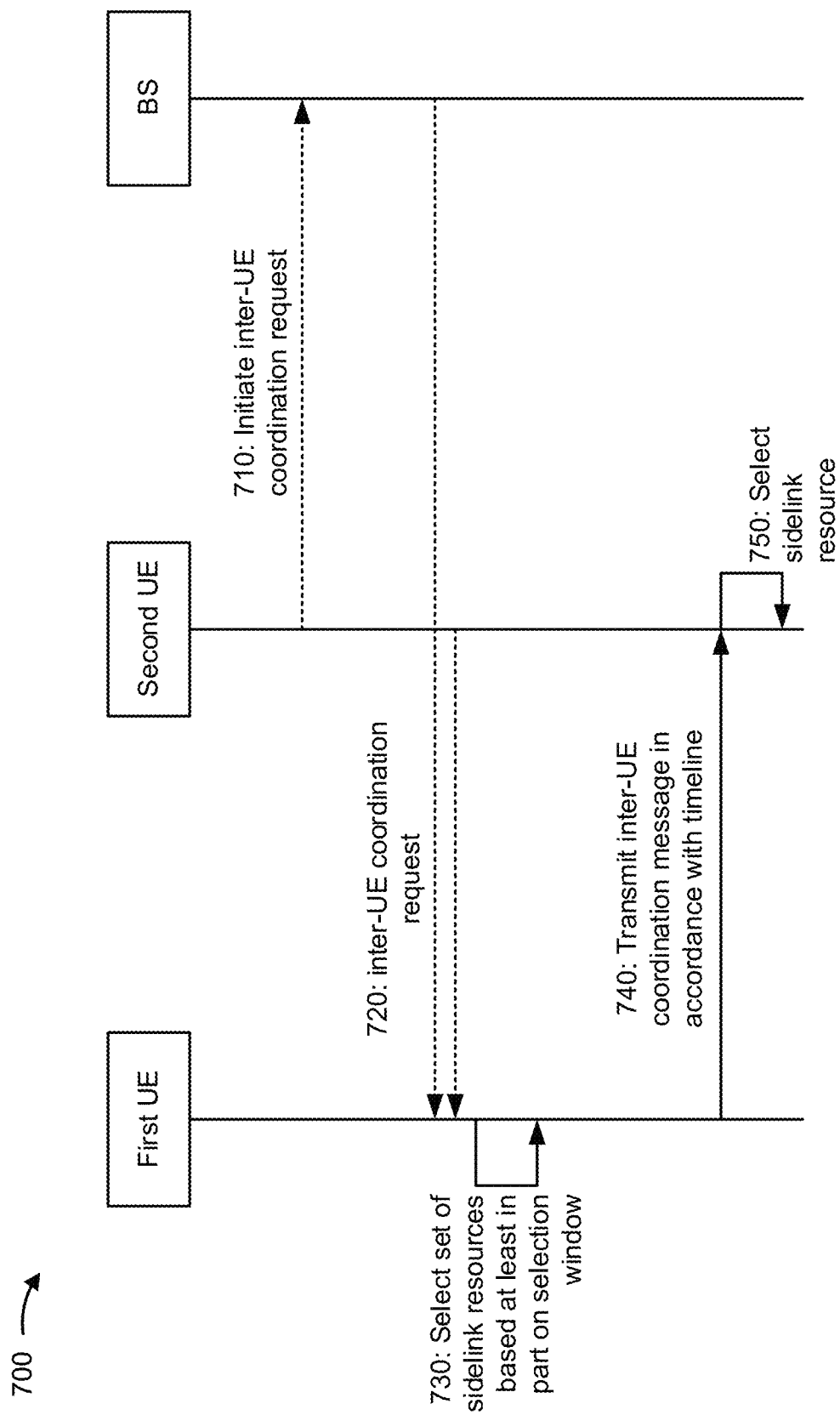
FIG. 7 is a diagram illustrating an example of signaling associated with inter-UE coordination based at least in part on a timeline, in accordance with the present disclosure.

FIG. 7 is a diagram illustrating an example 700 of signaling associated with inter-UE coordination based at least in part on a timeline, in accordance with the present disclosure. As shown, example 700 includes a first UE (e.g., UE 120, UE 305, UE 405, and/or the like), a second UE (e.g., UE 120, UE 305, UE 405, and/or the like), and a BS (e.g., BS 110). In example 700, the first UE determines to select a set of resources for an inter-UE coordination operation and signals the set of resources to the second UE in an inter-UE coordination message. The timeline may indicate times associated with one or more of a selection window (e.g., a length of the select window and/or a location of the selection window) or an inter-UE coordination message.

Reference numbers 710 and 720 show how the first UE may receive an inter-UE coordination request. The communications represented by reference numbers 710 and 720 are shown by dashed lines because only one of these communications (or neither of these communications) may occur, in some aspects. As shown by reference number 710, in some aspects, the second UE may provide an indication, to the BS, to initiate the inter-UE coordination request. As shown by reference number 720, the BS may provide the inter-UE coordination request to the first UE. As also shown by reference number 720, in some aspects, the second UE may provide an inter-UE coordination request to the first UE (e.g., directly to the first UE via a sidelink interface). In some aspects (not shown), the first UE may determine to perform an inter-UE coordination operation (e.g., without having received an inter-UE coordination request), for example, based at least in part on channel conditions and/or the like.

As shown by reference number 730, the first UE may select a set of sidelink resources based at least in part on a selection window. For example, the set of sidelink resources may be included in the selection window. The selection window may be independent of a resource selection window of the first UE (e.g., a window used to select resources for communication by the first UE). For example, the selection window may selected or determined independent of the resource selection window of the first UE. In other words, the selection window may be independent by not being based on the resource selection window of the first UE. As another example, the resource selection window may be independent by being different than the resource selection window of the first UE. For example, the selection window may be of a fixed length, which may be different than a length of the resource selection window. In some aspects, the fixed length may be equal to a maximum time duration for reserving resources for aperiodic transmission (e.g., 32 slots). In some aspects, the length of the selection window may be associated with a resource pool (e.g., a set of sidelink resources from which sidelink resources for the inter-UE coordination operation are selected). For example, the length of the selection window may be configured and/or fixed on a per resource pool basis. In some aspects, the length of the selection window may be based at least in part on a carrier. For example, the length of the selection window may be configured and/or fixed on a per-carrier basis. In some aspects, the length of the selection window may be determined based at least in part on a priority level of a packet indicated by the inter-UE coordination request (e.g., of traffic associated with the selection window). For example, a first length may be used for a first priority level, a second length may be used for a second priority level, and a third length may be used for a third priority level. In some aspects, the length of the selection window may be determined based at least in part on a PDB of traffic to be transmitted within the selection window. For example, a first length may be used for traffic with a PDB that fails to satisfy a threshold, and a second length may be used for traffic with a PDB that satisfies the threshold. In some aspects, the length of the selection window may be based at least in part on a cast type of traffic associated with the selection window. For example, a first length may be used for unicast traffic, a second length may be used for groupcast traffic, and a third length may be used for broadcast traffic. Additionally, or alternatively, one or more of the carrier, the priority level, or the cast type of traffic associated with the selection window may be a factor or a parameter used to select or determine the length of the selection window.

In some aspects, a length of the selection window may be indicated by the second UE or by the base station (or a relay associated with the base station). For example, the inter-UE coordination request may indicate the length of the selection window. As another example, the second UE or the base station may signal a length of the selection window via semi-static signaling (such as RRC signaling or PC5 signaling). In some aspects, the first UE may determine the length of the selection window based at least in part on how the inter-UE cooperation reporting is initiated. For example, the first UE may determine a first length of the selection window if the first UE receives the inter-UE coordination request from the second UE, a second length of the selection window if the first UE receives the inter-UE coordination request from the base station or a relay associated with the base station, and a third length of the selection window if the first UE determines to perform the inter-UE coordination operation.

In some aspects, a location of the selection window may be based at least in part on a reporting channel, such as a channel used to transmit the inter-UE coordination message. As used herein, the location of the selection window refers to the starting time of the selection window. For example, the selection window may start after a fixed gap from an end of the reporting channel. This fixed gap may be known to the first UE and the second UE, for example, based at least in part on configuration of the first UE and the second UE or signaling between the first UE and the second UE. In this way, processing time of the second UE is accommodated, and ambiguity regarding a mapping between the inter-UE coordination message and the sidelink resources of the selection window is reduced or eliminated.

As mentioned above, the first UE may select a set of sidelink resources in the selection window. In some aspects, the first UE may select the set of sidelink resources based at least in part on a determination that the first UE or one or more other UEs have not reserved the set of sidelink resources (e.g., based at least in part on a determination that the set of sidelink resources are clear for the second UE). For example, sidelink resources in the selection window that have not been reserved may be selected as the set of sidelink resources. In some aspects, the first UE may select the set of sidelink resources based at least in part on a noise level associated with the set of sidelink resources satisfying a threshold. For example, sidelink resources in the selection window that are associated with a noise level that satisfy the threshold may be selected as the set of sidelink resources. In some aspects, the first UE may select the set of sidelink resources based at least in part on a communication of the first UE (e.g., the set of sidelink resources may be selected so that communications by the second UE on the set of sidelink resources are aligned with a communication of the first UE, such as to support a relaying operation). In some aspects, the first UE may identify unavailable resources in the selection window that should not be included in the set of sidelink resources (such as based at least in part on the unavailable resources having a threshold noise level, an associated reservation, a particular location in the selection window, a configured communication, or the like), and may select at least part of the remaining resources of the selection window, other than the identified resources, as a set of available sidelink resources. In this case, the first UE may transmit information indicating at least one of the unavailable resources (e.g., non-preferred resources) or the set of available sidelink resources (e.g., preferred resources).

As shown by reference number 740, the first UE may transmit an inter-UE coordination message. The inter-UE coordination message may include inter-UE coordination information that indicates the selected set of sidelink resources, which may include available sidelink resources and/or unavailable sidelink resources. As further shown, the first UE may transmit the inter-UE coordination message in accordance with a timeline. For example, the first UE may transmit the inter-UE coordination message based at least in part on a minimum processing time. The minimum processing time may be configured for, determined by, or signaled to the first UE and the second UE. The minimum processing time may provide processing time for the first UE to generate the inter-UE coordination information and transmit the inter-UE coordination message. In some aspects, the minimum processing time may indicate a length of time between an end of a channel on which an inter-UE coordination request is received and a start of a channel on which the inter-UE coordination message is transmitted. In some aspects, the minimum processing time may indicate a length of time between determining that the inter-UE coordination operation is to be performed and a start of a channel on which the inter-UE coordination message is transmitted. Thus, processing times of the first UE and the second UE are accommodated, which reduces the likelihood of a communication failure associated with the inter-UE coordination operation.

As shown by reference number 750, the second UE may select a sidelink resource for a communication. For example, the sidelink resource may be included in the selection window. The second UE may select the sidelink resource based at least in part on the inter-UE coordination message. For example, the second UE may map the inter-UE coordination information of the inter-UE coordination message to resources in the selection window (e.g., based at least in part on the location and length of the selection window) in order to determine which resources of the selection window are available for the second UE. The second UE may select an available sidelink resource and may perform a communication on the available sidelink resource. Additionally, or alternatively, the second UE may avoid selecting an unavailable sidelink resource. For example, when the second UE receives the inter-UE coordination message, the second UE may use the portion of the inter-UE coordination message that is shorter than or equal to a packet delay budget of the packet that the second UE is trying to transmit. Thus, ambiguity associated with the inter-UE coordination information is reduced or eliminated and processing times associated with the first UE and the second UE are accommodated.

As indicated above, FIG. 7 is provided as an example. Other examples may differ from what is described with regard to FIG. 7.

Figure 8:
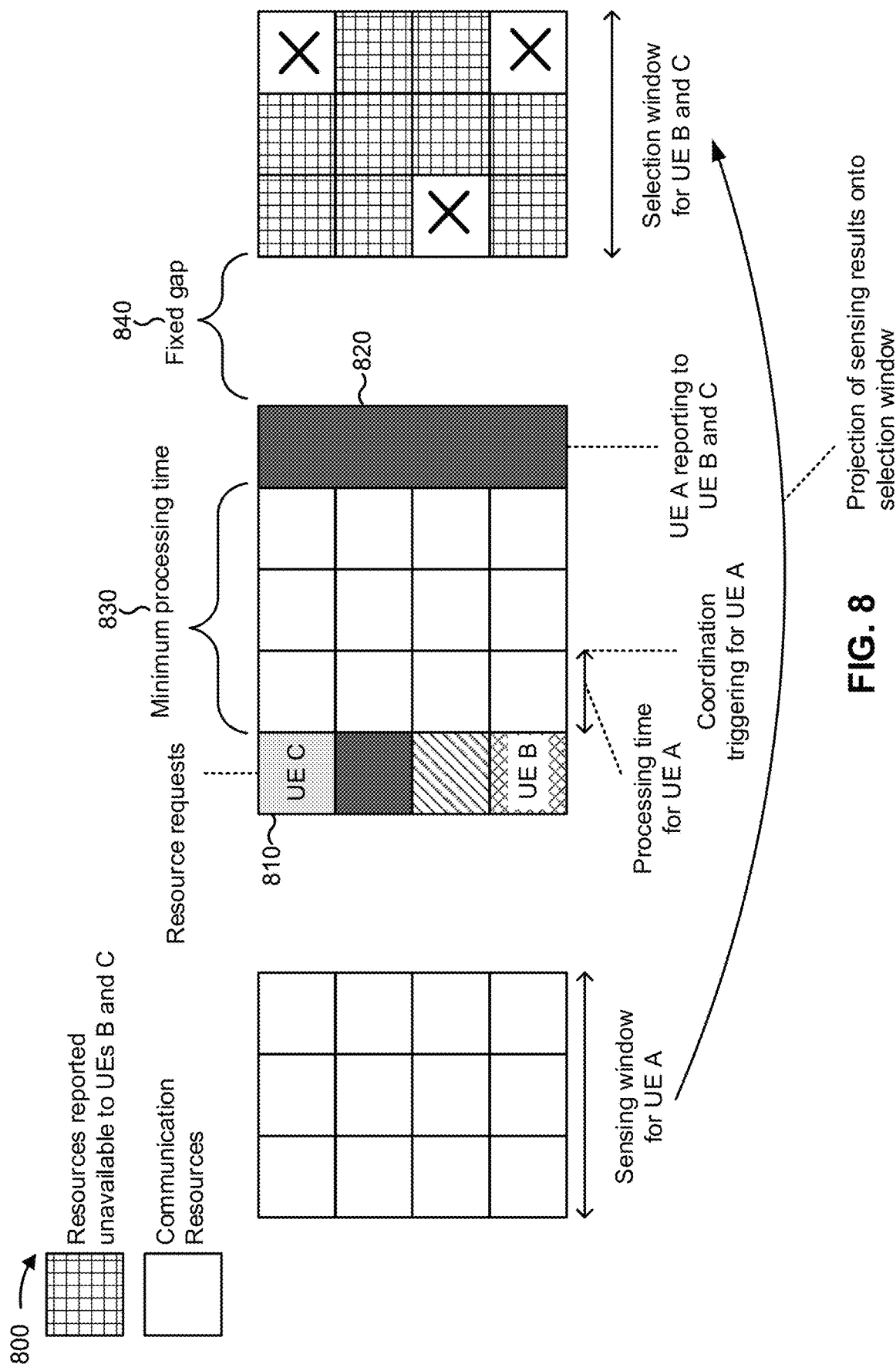
FIG. 8 is a diagram illustrating an example of resource sensing for sidelink inter-UE coordination, in accordance with the present disclosure.

FIG. 8 is a diagram illustrating an example 800 of resource sensing for sidelink inter-UE coordination, in accordance with the present disclosure.

As shown in FIG. 8, during a sensing window, a UE A (which may correspond to, for example, UE 120*a*) may coordinate with other UEs, such as a UE B (which may correspond to, for example, UE 120*e*) and a UE C. For example, UEs B and/or C may request assistance from UE A in determining whether resources are available for communication. In another example, UE A may receive a request from a B S or a relay BS to assist with inter-UE coordination. In yet another example, UE A may autonomously determine to transmit an inter-UE coordination message, such as based at least in part on observed network conditions.

UE A may, during a sensing window, monitor for resource availability. UE A may detect an inter-UE coordination request from, for example, UE B, UE C, and other UEs, on the resources shown by reference number 810. As shown, UE A may experience a processing delay between when UE A detects a request for resources and when UE A has processed the request and is triggered to transmit an inter-UE coordination message to identify whether or not resources are available on the resource shown by reference number 820. By enforcing a minimum time gap, shown by reference number 830 as a minimum processing time between receiving the inter-UE coordination request and transmitting the inter-UE coordination message, time for processing of the inter-UE coordination request by UE A is provided. Furthermore, the minimum time gap may be configured for UE A, UE B, and/or UE C, thereby eliminating ambiguity as to a transmission time of the inter-UE coordination message. In some aspects, UE A may transmit the inter-UE coordination message in a first available resource after the minimum processing time.

In some aspects, UE A may determine to transmit the inter-UE coordination message (e.g., without receiving an inter-UE coordination request). In some examples, UE A may transmit the inter-UE coordination message after a minimum processing time that is defined relative to a time of determining to transmit the inter-UE coordination message (e.g., from the time that coordination is triggered). In some aspects, UE A may transmit the inter-UE coordination message in a first available resource after the minimum processing time.

As further shown in FIG. 8, UE A may transmit reporting regarding whether resources are available to UE B, UE C, and/or other UEs. For example, the reporting may identify available sidelink resources and/or unavailable sidelink resources. This reporting may be referred to as an inter-UE coordination message or inter-UE coordination reporting. The transmission of the reporting may occur a threshold processing time before a selection window during which UE A, UE B, UE C, and other UEs may use resources that UE A has identified as available of unavailable. As shown by reference number 840, the selection window may occur after a time gap (e.g., a fixed gap, a configured gap, and/or the like) has elapsed subsequent to the inter-UE coordination message shown by reference number 840. For example, the selection window may start after a fixed gap measured from an end of a channel on which the inter-UE coordination message is transmitted. Thus, ambiguity as to the location of the selection window is eliminated and processing time of UE B and/or UE C is taken into account.

As shown, UE A identifies one or more resources as available to UE B and UE C and other resources as unavailable to UE B and UE C. According to various techniques and apparatuses described herein, the selection window may be independent of a resource selection window of UE A, so that a size of the selection window can be consistent across UE A, UE B, and UE C, and is not dependent on a configuration of UE A.

As indicated above, FIG. 8 is provided as an example. Other examples may differ from what is described with respect to FIG. 8.

Figure 9:
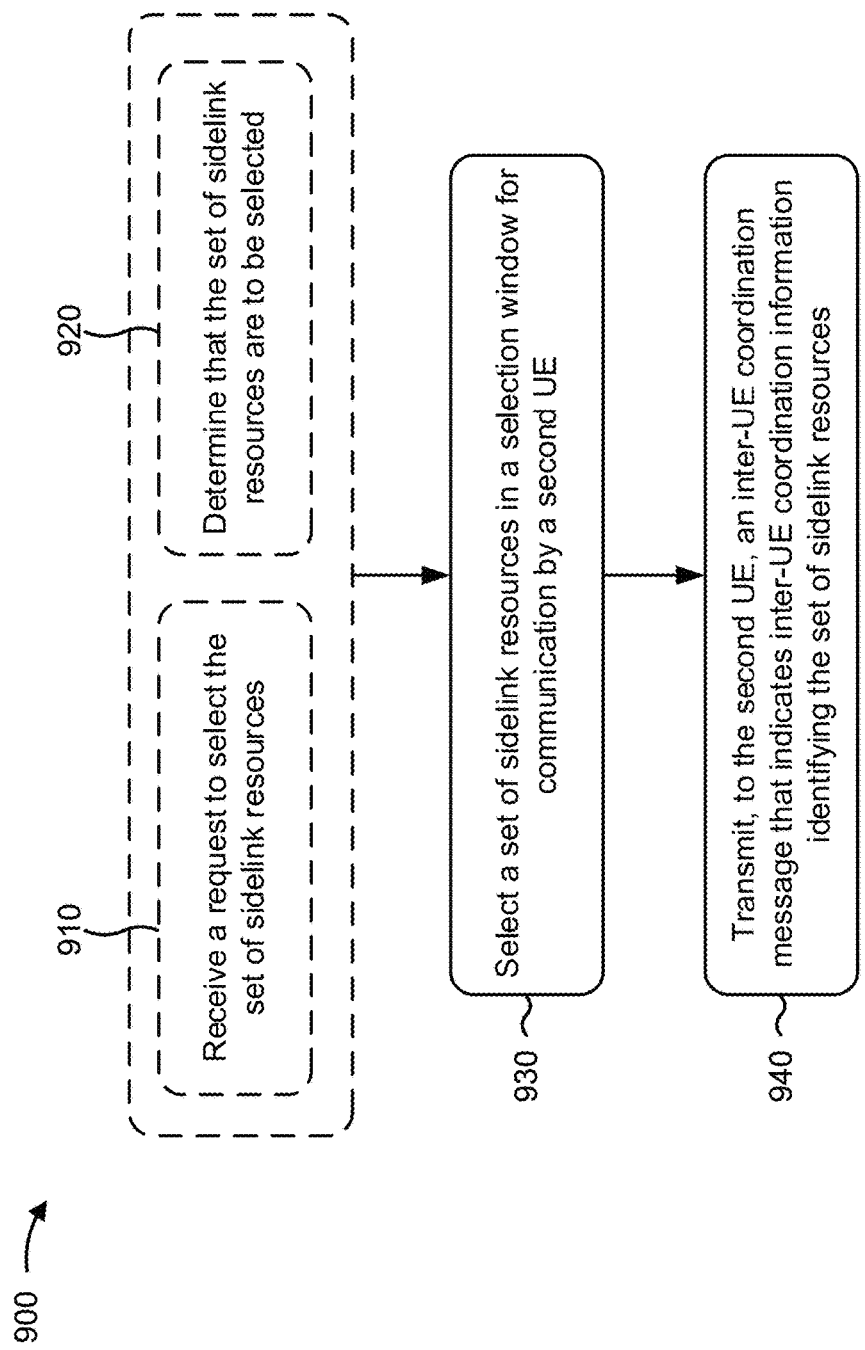
FIGS. 9-11 are diagrams illustrating example processes associated with inter-UE coordination, in accordance with the present disclosure.

FIG. 9 is a diagram illustrating an example process 900 performed, for example, by a UE, in accordance with the present disclosure. Example process 900 is an example where a first UE (e.g., UE 120, UE 305, UE 405) performs operations associated with a timeline for sidelink inter-UE coordination. Dashed blocks indicate optional steps.

As shown in FIG. 9, in some aspects, process 900 may include receiving a request to select a set of sidelink resources (block 910). For example, in some aspects, the first UE (e.g., using antenna 252, DEMOD 254, MIMO detector 256, receive processor 258, controller/processor 280, and/or the like) may receive a request to select a set of sidelink resources. In some aspects, the request is referred to herein as an inter-UE coordination request. In some aspects, the request is received from the second UE. In some aspects, the request is received from a base station or a relay. The set of sidelink resources can include a set of available sidelink resources (e.g., preferred sidelink resources) and/or a set of unavailable sidelink resources (e.g., non-preferred sidelink resources). As shown in FIG. 9, in some aspects, process 900 may include determining that the set of sidelink resources are to be selected (block 920). For example, in some aspects, the first UE (e.g., using antenna 252, DEMOD 254, MIMO detector 256, receive processor 258, controller/processor 280, and/or the like) may determine that the set of sidelink resources are to be selected.

As shown in FIG. 9, in some aspects, process 900 may include selecting a set of sidelink resources in a selection window for communication by a second UE (block 930). For example, the UE (e.g., using antenna 252, demodulator 254, MIMO detector 256, receive processor 258, transmit processor 264, TX MIMO processor 266, modulator 254, controller/processor 280, and/or memory 282) may select a set of sidelink resources in a selection window for communication by a second UE, as described above. In some aspects, the selection of the sidelink resources may be referred to herein as determining inter-UE coordination information or performing an inter-UE coordination operation. In some aspects, the set of sidelink resources may include available sidelink resources and/or unavailable sidelink resources.

As further shown in FIG. 9, in some aspects, process 900 may include transmitting, to the second UE, an inter-UE coordination message that indicates inter-UE coordination information identifying the set of sidelink resources (block 940). For example, the UE (e.g., using antenna 252, transmit processor 264, TX MIMO processor 266, modulator 254, controller/processor 280, and/or memory 282) may transmit, to the second UE, an inter-UE coordination message that indicates inter-UE coordination information identifying the set of sidelink resources. In some aspects, the selection window is different than a resource selection window of the first UE. For example, the selection window may be independent of a resource selection window of the first UE, as described above. As another example, the selection window is of a length different than a length of a resource selection window of the first UE.

Process 900 may include additional aspects, such as any single aspect or any combination of aspects described below and/or in connection with one or more other processes described elsewhere herein.

In a first aspect, the selection window is associated with a fixed length.

In a second aspect, alone or in combination with the first aspect, the fixed length is equal to a maximum time duration for reserving sidelink resources.

In a third aspect, alone or in combination with one or more of the first and second aspects, a length of the selection window is associated with a resource pool of the set of sidelink resources.

In a fourth aspect, alone or in combination with one or more of the first through third aspects, a length of the selection window is associated with a carrier associated with the set of sidelink resources.

In a fifth aspect, alone or in combination with one or more of the first through fourth aspects, process 900 includes receiving a request to select the set of sidelink resources, wherein the request indicates a length of the selection window or a time associated with the selection window.

In a sixth aspect, alone or in combination with one or more of the first through fifth aspects, the request is received from the second UE.

In a seventh aspect, alone or in combination with one or more of the first through sixth aspects, the request is received from a base station or a relay associated with a base station.

In an eighth aspect, alone or in combination with one or more of the first through seventh aspects, a length of the selection window is based at least in part on whether the request is received from the second UE, a base station, or a relay associated with a base station.

In a ninth aspect, alone or in combination with one or more of the first through eighth aspects, the selection window is defined based at least in part on a fixed gap between a reporting channel on which the inter-UE coordination message is transmitted and a start of the selection window.

In a tenth aspect, alone or in combination with one or more of the first through ninth aspects, process 900 includes receiving a request to determine the inter-UE coordination information, wherein the inter-UE coordination message is transmitted after a minimum time gap from an end of a channel carrying the request.

In an eleventh aspect, alone or in combination with one or more of the first through tenth aspects, the minimum time gap is based at least in part on receiving the request from a base station or the second UE.

In a twelfth aspect, alone or in combination with one or more of the first through eleventh aspects, process 900 includes determining that the set of sidelink resources are to be selected, wherein the inter-UE coordination message is transmitted after a minimum time gap based at least in part on a time associated with the determination that the set of sidelink resources are to be selected.

In a thirteenth aspect, alone or in combination with one or more of the first through twelfth aspects, the inter-UE coordination message is transmitted in a first available resource after the minimum time gap.

In a fourteenth aspect, alone or in combination with one or more of the first through twelfth aspects, the selection window is configured using semi-static signaling.

In a fifteenth aspect, alone or in combination with one or more of the first through fourteenth aspects, the selection window is based at least in part on at least one of: a cast type of traffic associated with the selection window, a packet delay budget of the traffic, or a priority of the traffic.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
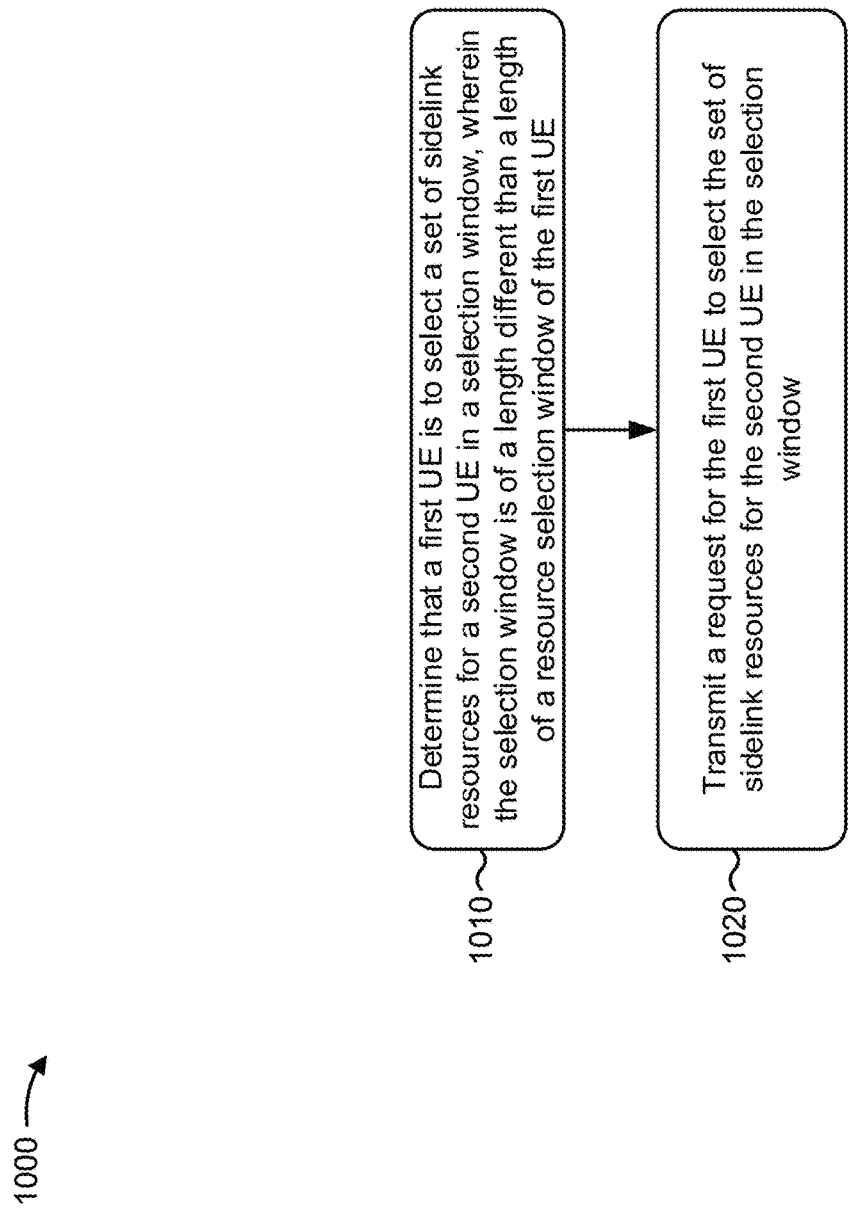

FIG. 10 is a diagram illustrating an example process 1000 performed, for example, by a base station, in accordance with the present disclosure. Example process 1000 is an example where the base station (e.g., base station 110) performs operations associated with a timeline for sidelink inter-UE coordination.

As shown in FIG. 10, in some aspects, process 1000 may include determining that a first UE is to select a set of sidelink resources for a second UE in a selection window (block 1010). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may determine that a first UE is to select a set of sidelink resources for a second UE in a selection window, as described above.

As further shown in FIG. 10, in some aspects, process 1000 may include transmitting a request for the first UE to select the set of sidelink resources for the second UE in a selection window, wherein the selection window is of a length different than a length of a resource selection window of the first UE (block 1020). For example, the base station (e.g., using transmit processor 220, TX MIMO processor 230, modulator 232, antenna 234, controller/processor 240, memory 242, and/or scheduler 246) may transmit a request for the first UE to select the set of sidelink resources for the second UE in a selection window, wherein the selection window is independent of a resource selection window of the first UE. In some aspects, the selection window is of a length different than a length of a resource selection window of the first UE, as described above.

Process 1000 may include additional aspects, such as any single aspect or any combination of aspects described below and/or in connection with one or more other processes described elsewhere herein.

In a first aspect, the request indicates the selection window. For example, the request may indicate a time (e.g., location) of the selection window or a length of the selection window.

In a second aspect, alone or in combination with the first aspect, the selection window is associated with a fixed length.

In a third aspect, alone or in combination with one or more of the first and second aspects, the fixed length is equal to a maximum time duration for reserving sidelink resources.

In a fourth aspect, alone or in combination with one or more of the first through third aspects, a length of the selection window is associated with a resource pool of the set of sidelink resources.

In a fifth aspect, alone or in combination with one or more of the first through fourth aspects, a length of the selection window is associated with a carrier associated with the set of sidelink resources.

In a sixth aspect, alone or in combination with one or more of the first through fifth aspects, the set of sidelink resources are reported using an inter-UE coordination message that is transmitted after a minimum time gap from an end of a channel carrying the request.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
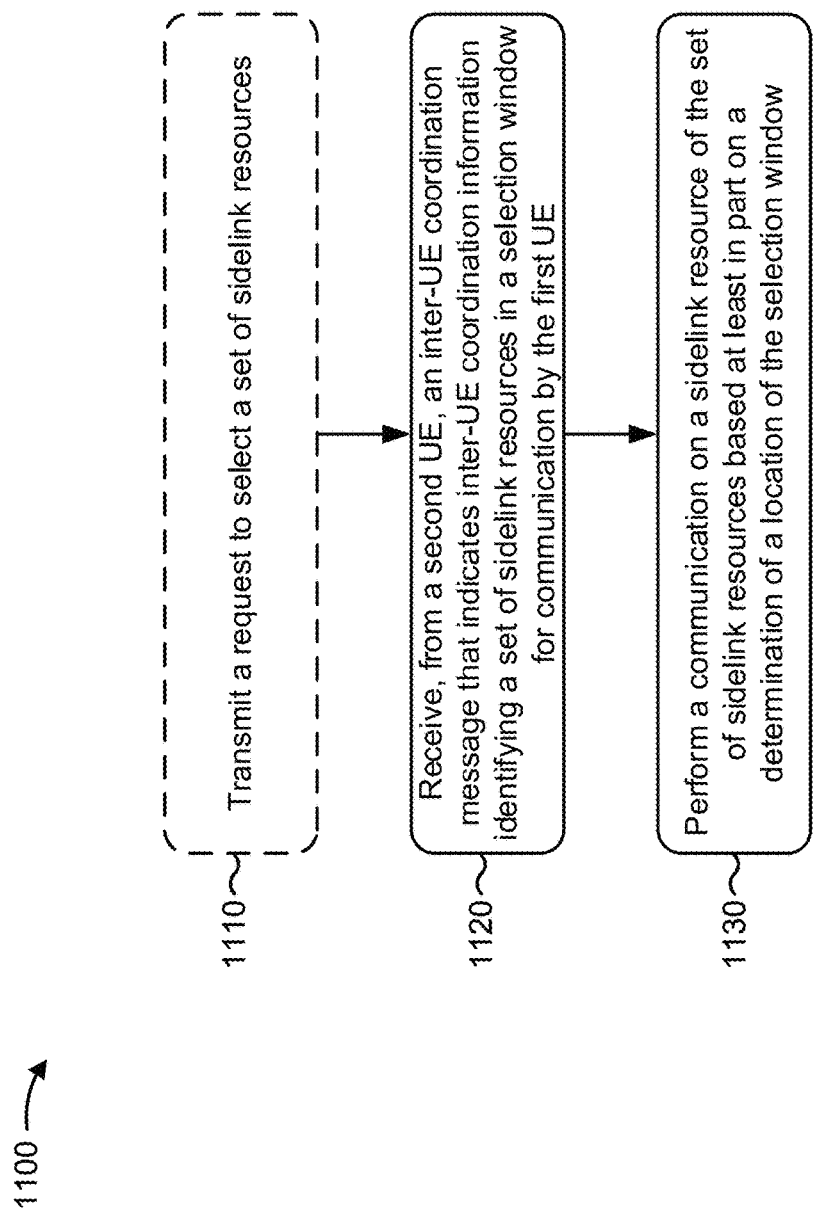

FIG. 11 is a diagram illustrating an example process 1100 performed, for example, by a UE, in accordance with the present disclosure. Example process 1100 is an example where a first UE (e.g., UE 120, UE 305, UE 405) performs operations associated with timeline for sidelink inter-UE coordination. It should be noted that the first UE of FIG. 11 is the second UE of FIGS. 5 and 7, and UE B or UE C of FIG. 8. In other words, the first UE and the second UE are switched in example process 1100 relative to example processes 900 and 1000.

As shown in FIG. 11, in some aspects, process 1100 may include transmitting a request to select a set of sidelink resources (block 1110). For example, the first UE (e.g., using controller/processor 280, transmit processor 264, TX MIMO processor 266, MOD 254, antenna 252, and/or the like) may transmit a request to select a set of sidelink resources, as described above.

As shown in FIG. 11, in some aspects, process 1100 may include receiving, from a second UE, an inter-UE coordination message that indicates inter-UE coordination information identifying a set of sidelink resources in a selection window for communication by the first UE (block 1120). For example, the first UE (e.g., using antenna 252, demodulator 254, MIMO detector 256, receive processor 258, controller/processor 280, and/or memory 282) may receive, from a second UE, an inter-UE coordination message that indicates inter-UE coordination information identifying a set of sidelink resources in a selection window for communication by the first UE, as described above.

As further shown in FIG. 11, in some aspects, process 1100 may include performing a communication on a sidelink resource of the set of sidelink resources based at least in part on a determination of a location of the selection window (block 1130). For example, the first UE (e.g., using antenna 252, demodulator 254, MIMO detector 256, receive processor 258, transmit processor 264, TX MIMO processor 266, modulator 254, controller/processor 280, and/or memory 282) may perform a communication on a sidelink resource of the set of sidelink resources based at least in part on a determination of a location of the selection window, as described above. The first UE may determine the location of the selection window based at least in part on a timeline. For example, the first UE may determine the location of the selection window based at least in part on a location of a channel that carries the inter-UE coordination message and based at least in part on a fixed gap. In some aspects, the first UE may determine a length of the selection window, for example, based at least in part on a fixed gap, a configuration of the first UE and/or the second UE, and/or the like.

Process 1100 may include additional aspects, such as any single aspect or any combination of aspects described below and/or in connection with one or more other processes described elsewhere herein.

In a first aspect, the selection window is associated with a fixed length.

In a second aspect, alone or in combination with the first aspect, the fixed length is equal to a maximum time duration for reserving sidelink resources.

In a third aspect, alone or in combination with one or more of the first and second aspects, a length of the selection window is associated with a resource pool of the set of sidelink resources.

In a fourth aspect, alone or in combination with one or more of the first through third aspects, a length of the selection window is associated with a carrier associated with the set of sidelink resources.

In a fifth aspect, alone or in combination with one or more of the first through fourth aspects, process 1100 includes transmitting a request to select the set of sidelink resources, wherein the request indicates a length of the selection window or the location of the selection window.

In a sixth aspect, alone or in combination with one or more of the first through fifth aspects, the determination of the location of the selection window is based at least in part on a fixed gap between a reporting channel on which the inter-UE coordination message is received and a start of the selection window.

In a seventh aspect, alone or in combination with one or more of the first through sixth aspects, process 1100 includes transmitting a request to select the set of sidelink resources, wherein the inter-UE coordination message is received after a minimum time gap from an end of a channel carrying the request.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
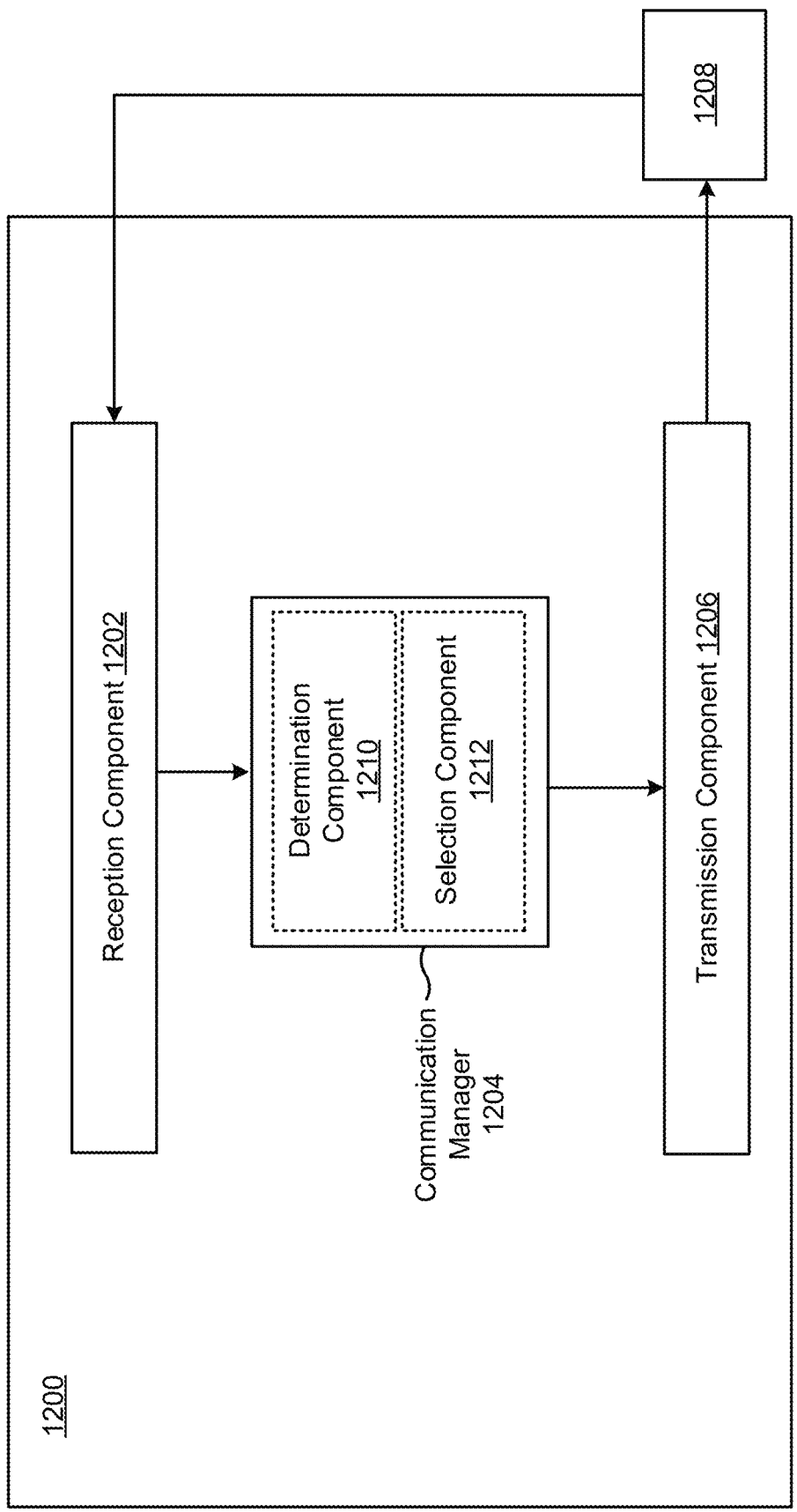
FIG. 12 is a block diagram of an example apparatus for wireless communication, in accordance with the present disclosure.

FIG. 12 is a block diagram of an example apparatus 1200 for wireless communication in accordance with the present disclosure. The apparatus 1200 may be a first UE, or a first UE may include the apparatus 1200. In some aspects, the apparatus 1200 includes a reception component 1202, a communication manager 1204, and a transmission component 1206, which may be in communication with one another (for example, via one or more buses). As shown, the apparatus 1200 may communicate with another apparatus 1208 (such as a UE, a base station, or another wireless communication device) using the reception component 1202 and the transmission component 1206.

In some aspects, the apparatus 1200 may be configured to perform one or more operations described herein in connection with FIGS. 6-8. Additionally or alternatively, the apparatus 1200 may be configured to perform one or more processes described herein, such as process 900 of FIG. 9, process 1100 of FIG. 11, or a combination thereof. In some aspects, the apparatus 1200 may include one or more components of the first UE described above in connection with FIG. 2.

The reception component 1202 may provide means for receiving communications, such as reference signals, control information, data communications, or a combination thereof, from the apparatus 1208. The reception component 1202 may provide received communications to one or more other components of the apparatus 1200, such as the communication manager 1204. In some aspects, the reception component 1202 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the first UE described above in connection with FIG. 2.

The transmission component 1206 may provide means for transmitting communications, such as reference signals, control information, data communications, or a combination thereof, to the apparatus 1208. In some aspects, the communication manager 1204 may generate communications and may transmit the generated communications to the transmission component 1206 for transmission to the apparatus 1208. In some aspects, the transmission component 1206 may provide means for performing signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1206 may include one or more antennas, a modulator, a transmit MIMO processor, a transmit processor, a controller/processor, a memory, or a combination thereof, of the first UE described above in connection with FIG. 2. In some aspects, the transmission component 1206 may be co-located with the reception component 1202 in a transceiver.

In some aspects, the communication manager 1204 may provide means for selecting a set of sidelink resources in a selection window for communication by a second UE; and means for transmitting, to the second UE, an inter-UE coordination message that indicates inter-UE coordination information identifying the set of sidelink resources, wherein the selection window is of a length different than a length of a resource selection window of the first UE. In some aspects, the communication manager 1204 may provide means for receiving, from a second UE, an inter-UE coordination message that indicates inter-UE coordination information identifying a set of sidelink resources in a selection window for communication by the first UE; and means for performing a communication on a sidelink resource of the set of sidelink resources based at least in part on a determination of a location of the selection window. In some aspects, the communication manager 1204 may include a controller/processor, a memory, or a combination thereof, of the first UE described above in connection with FIG. 2.

In some aspects, the communication manager 1204 may include a set of components, such as a determination component 1210, a selection component 1212, or a combination thereof. Alternatively, the set of components may be separate and distinct from the communication manager 1204.

In some aspects, the communication manager 1204 and/or one or more components of the set of components may include or may be implemented within hardware (e.g., one or more of the circuitry described in connection with FIG. 16). In some aspects, the communication manager 1204 and/or one or more components of the set of components may include or may be implemented within a controller/processor, a memory, or a combination thereof, of the UE 120 described above in connection with FIG. 2.

In some aspects, the communication manager 1204 and/or one or more components of the set of components may be implemented in code (e.g., as software or firmware stored in a memory), such as the code described in connection with FIG. 16. For example, the communication manager 1204 and/or a component (or a portion of a component) may be implemented as instructions or code stored in a non-transitory computer-readable medium and executable by a controller or a processor to perform the functions or operations of the communication manager 1204 and/or the component. If implemented in code, the functions of the communication manager 1204 and/or a component may be executed by a controller/processor, a memory, a scheduler, a communication unit, or a combination thereof, of the UE 120 described above in connection with FIG. 2.

In some aspects, the reception component 1202 may provide means for receiving a request to select a set of sidelink resources. The determination component 1210 may provide means for determining that a set of sidelink resources are to be selected. The selection component 1212 may provide means for selecting the set of sidelink resources in a selection window for communication by a UE. The transmission component 1206 may provide means for transmitting, to the UE, an inter-UE coordination message that indicates inter-UE coordination information identifying the set of sidelink resources.

In some aspects, the transmission component 1206 may provide means for transmitting a request to select a set of sidelink resources. The reception component 1202 may provide means for receiving, from a second UE, an inter-UE coordination message that indicates inter-UE coordination information identifying a set of sidelink resources in a selection window for communication by the apparatus 1200. In some aspects, the selection component 1212 may provide means for selecting a sidelink resource of the set of sidelink resources. The reception component 1202 or the transmission component 1206 may provide means for performing a communication on a sidelink resource of the set of sidelink resources based at least in part on a determination of a location of the selection window.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
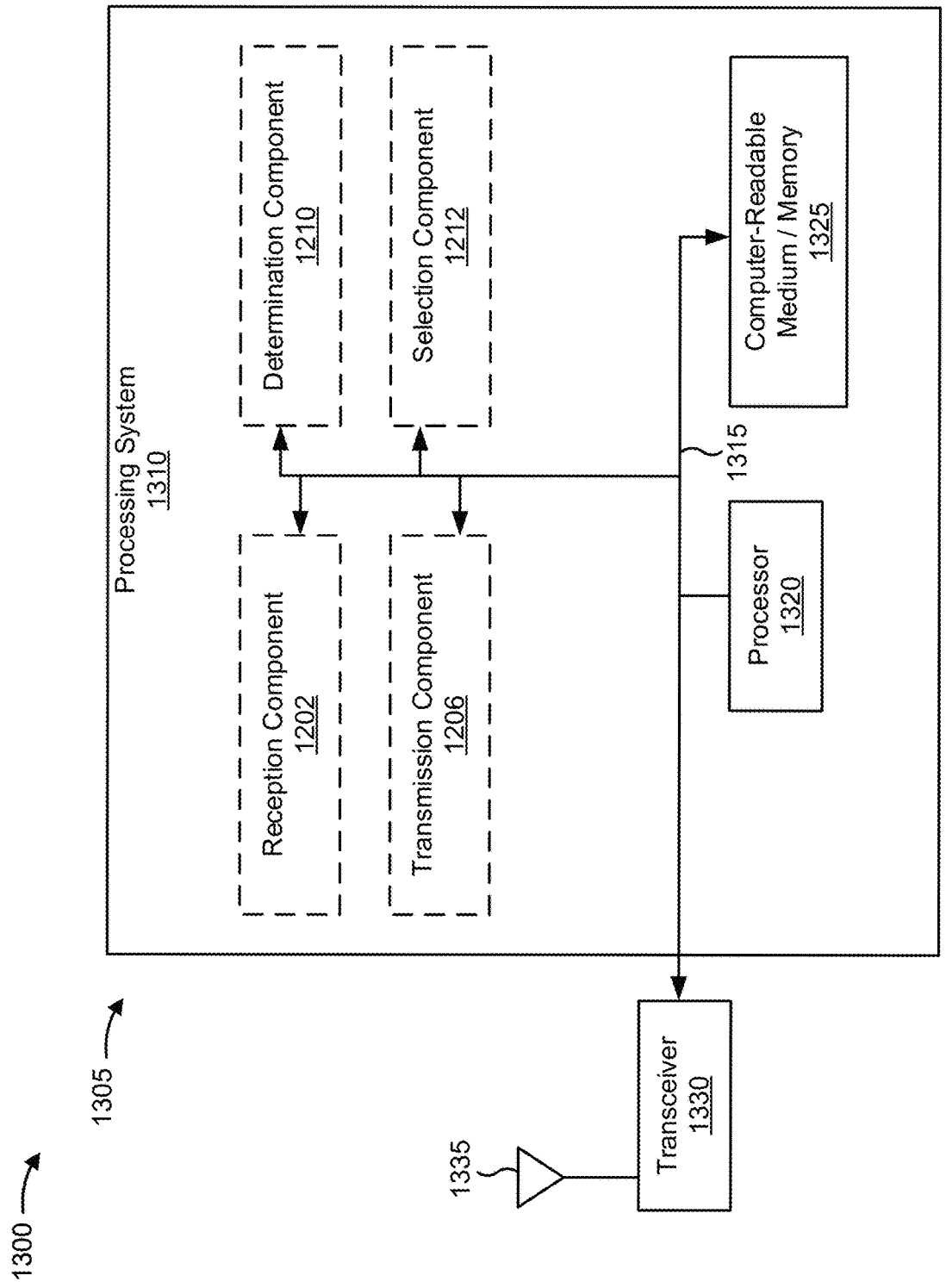
FIG. 13 is a diagram illustrating an example of a hardware implementation for an apparatus employing a processing system, in accordance with the present disclosure.

FIG. 13 is a diagram illustrating an example 1300 of a hardware implementation for an apparatus 1305 employing a processing system 1310. The apparatus 1305 may be a first UE.

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors and/or hardware components, represented by the processor 1320, the illustrated components, and the computer-readable medium/memory 1325. The bus 1315 may also link various other circuits, such as timing sources, peripherals, voltage regulators, power management circuits, and/or the like.

The processing system 1310 may be coupled to a transceiver 1330. The transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310, specifically the reception component 1202. In addition, the transceiver 1330 receives information from the processing system 1310, specifically the transmission component 1206, and generates a signal to be applied to the one or more antennas 1335 based at least in part on the received information.

The processing system 1310 includes a processor 1320 coupled to a computer-readable medium/memory 1325. The processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the illustrated components. The components may be software modules running in the processor 1320, resident/stored in the computer-readable medium/memory 1325, one or more hardware modules coupled to the processor 1320, or some combination thereof.

In some aspects, the processing system 1310 may be a component of the UE 120 and may include the memory 282 and/or at least one of the TX MIMO processor 266, the RX processor 258, and/or the controller/processor 280. In some aspects, the apparatus 1305 for wireless communication provides means for selecting a set of sidelink resources in a selection window for communication by a second UE, wherein the selection window is of a length different than a length of a resource selection window of the first UE; and means for transmitting, to the second UE, an inter-UE coordination message that indicates inter-UE coordination information identifying the set of sidelink resources. In some aspects, the apparatus 1305 for wireless communication may provide means for receiving, from a second UE, an inter-UE coordination message that indicates inter-UE coordination information identifying a set of sidelink resources in a selection window for communication by the first UE; and means for performing a communication on a sidelink resource of the set of sidelink resources based at least in part on a determination of a location of the selection window. The aforementioned means may be one or more of the aforementioned components of the apparatus 1200 and/or the processing system 1310 of the apparatus 1305 configured to perform the functions recited by the aforementioned means. As described elsewhere herein, the processing system 1310 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 13 is provided as an example. Other examples may differ from what is described in connection with FIG. 13.

Figure 14:
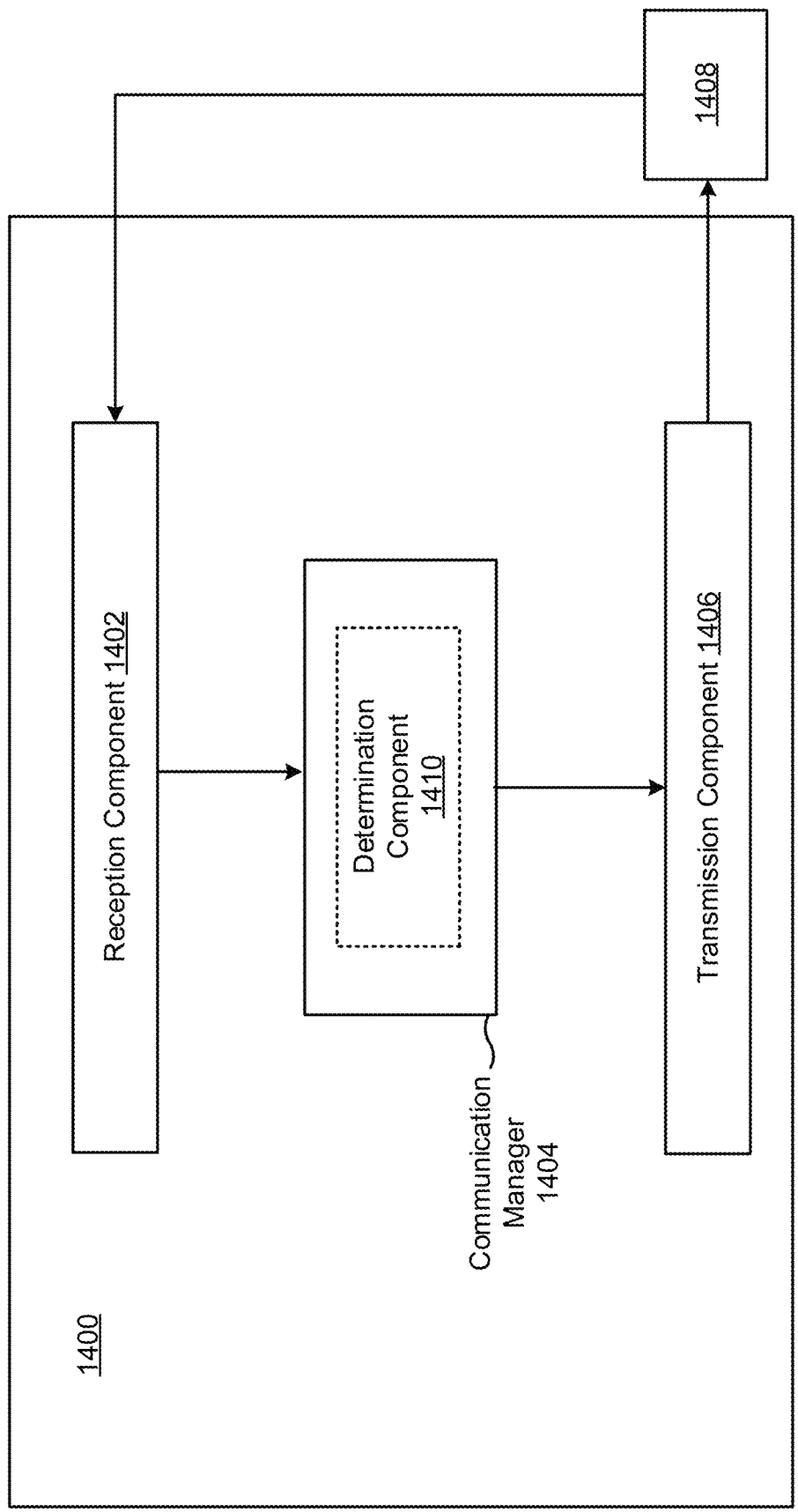
FIG. 14 is a block diagram of an example apparatus for wireless communication, in accordance with the present disclosure.

FIG. 14 is a block diagram of an example apparatus 1400 for wireless communication in accordance with the present disclosure. The apparatus 1400 may be a base station, or a base station may include the apparatus 1400. In some aspects, the apparatus 1400 includes a reception component 1402, a communication manager 1404, and a transmission component 1406, which may be in communication with one another (for example, via one or more buses). As shown, the apparatus 1400 may communicate with another apparatus 1408 (such as a UE, a base station, or another wireless communication device) using the reception component 1402 and the transmission component 1406.

In some aspects, the apparatus 1400 may be configured to perform one or more operations described herein in connection with FIGS. 6-8. Additionally or alternatively, the apparatus 1400 may be configured to perform one or more processes described herein, such as process 1000 of FIG. 10. In some aspects, the apparatus 1400 may include one or more components of the base station described above in connection with FIG. 2.

The reception component 1402 may provide means for receiving communications, such as reference signals, control information, data communications, or a combination thereof, from the apparatus 1408. The reception component 1402 may provide received communications to one or more other components of the apparatus 1400, such as the communication manager 1404. In some aspects, the reception component 1402 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a demodulator, a MIMO detector, a receive processor, a controller/processor, a memory, or a combination thereof, of the base station described above in connection with FIG. 2.

The transmission component 1406 may provide means for transmitting communications, such as reference signals, control information, data communications, or a combination thereof, to the apparatus 1408. In some aspects, the communication manager 1404 may generate communications and may transmit the generated communications to the transmission component 1406 for transmission to the apparatus 1408. In some aspects, the transmission component 1406 may provide means for performing signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1406 may include one or more antennas, a modulator, a transmit MIMO processor, a transmit processor, a controller/processor, a memory, or a combination thereof, of the base station described above in connection with FIG. 2. In some aspects, the transmission component 1406 may be co-located with the reception component 1402 in a transceiver.

The communication manager 1404 may provide means for determining that a first UE is to select a set of sidelink resources for a second UE in a selection window, wherein the selection window is of a length different than a length of a resource selection window of the first UE; and means for transmitting a request for the first UE to select the set of sidelink resources for the second UE in a selection window. In some aspects, the communication manager 1404 may include a controller/processor, a memory, a scheduler, a communication unit, or a combination thereof, of the base station described above in connection with FIG. 2.

In some aspects, the communication manager 1404 may include a set of components, such as a determination component 1410. Alternatively, the set of components may be separate and distinct from the communication manager 1404.

In some aspects, the communication manager 1404 and/or one or more components of the set of components may include or may be implemented within hardware (e.g., one or more of the circuitry described in connection with FIG. 17). In some aspects, the communication manager 1404 and/or one or more components of the set of components may include or may be implemented within a controller/processor, a memory, or a combination thereof, of the BS 110 described above in connection with FIG. 2.

In some aspects, the communication manager 1404 and/or one or more components of the set of components may be implemented in code (e.g., as software or firmware stored in a memory), such as the code described in connection with FIG. 16. For example, the communication manager 1404 and/or a component (or a portion of a component) may be implemented as instructions or code stored in a non-transitory computer-readable medium and executable by a controller or a processor to perform the functions or operations of the communication manager 1404 and/or the component. If implemented in code, the functions of the communication manager 1404 and/or a component may be executed by a controller/processor, a memory, a scheduler, a communication unit, or a combination thereof, of the BS 110 described above in connection with FIG. 2.

In some aspects, the reception component 1402 may provide means for receiving an indication from a second UE indicating that a first UE is to select a set of available sidelink for a second UE in a selection window. The determination component 1410 may provide means for determining that the first UE is to select the set of sidelink resources for the second UE in the selection window, wherein the selection window is of a length different than a length of a resource selection window of the first UE. The transmission component 1406 may provide means for transmitting a request for the first UE to select the set of sidelink resources for the second UE in a selection window.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
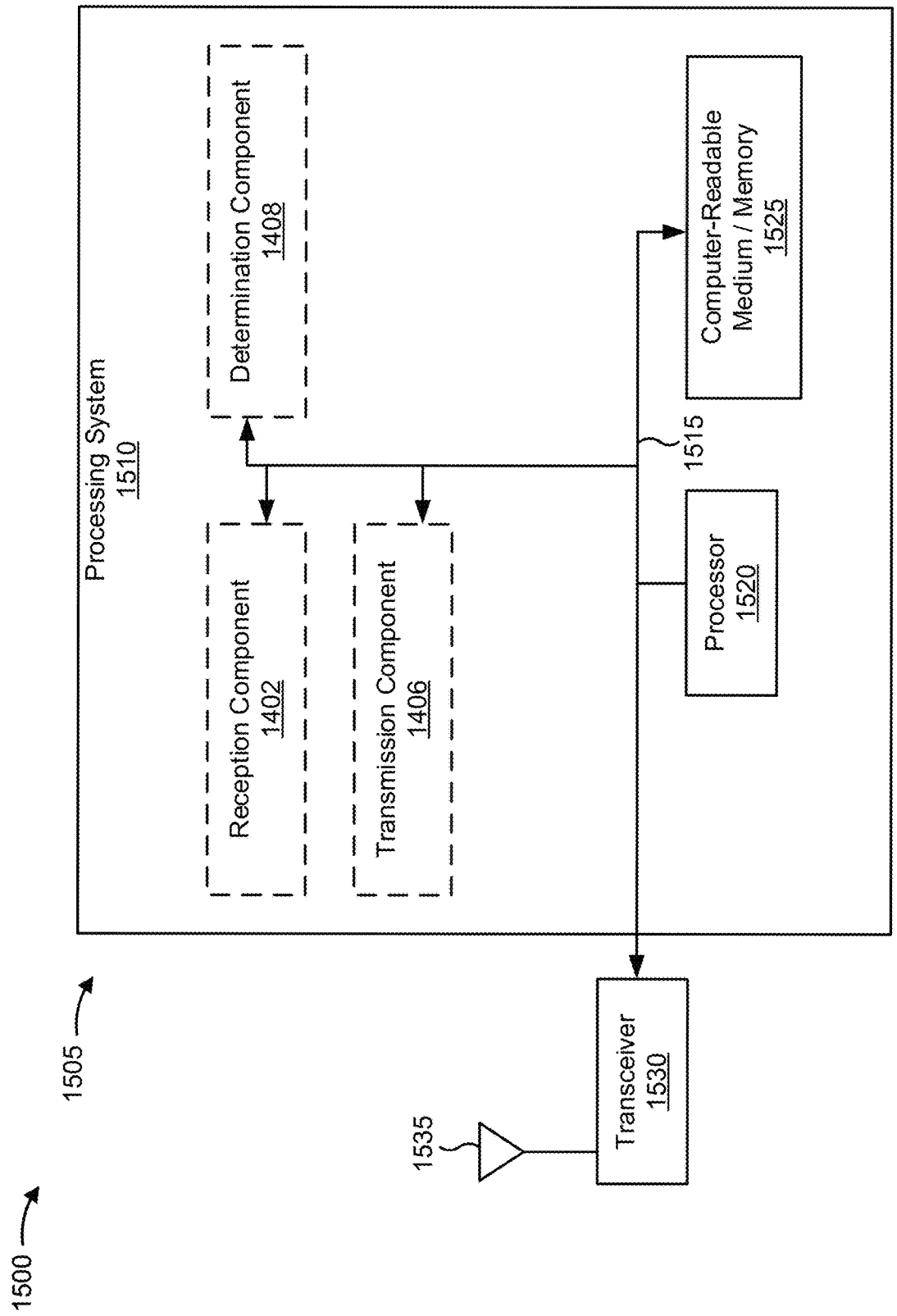
FIG. 15 is a diagram illustrating an example of a hardware implementation for an apparatus employing a processing system, in accordance with the present disclosure.

FIG. 15 is a diagram illustrating an example 1500 of a hardware implementation for an apparatus 1505 employing a processing system 1510. The apparatus 1505 may be a base station.

The processing system 1510 may be implemented with a bus architecture, represented generally by the bus 1515. The bus 1515 may include any number of interconnecting buses and bridges depending on the specific application of the processing system 1510 and the overall design constraints. The bus 1515 links together various circuits including one or more processors and/or hardware components, represented by the processor 1520, the illustrated components, and the computer-readable medium/memory 1525. The bus 1515 may also link various other circuits, such as timing sources, peripherals, voltage regulators, power management circuits, and/or the like.

The processing system 1510 may be coupled to a transceiver 1530. The transceiver 1530 is coupled to one or more antennas 1535. The transceiver 1530 provides a means for communicating with various other apparatuses over a transmission medium. The transceiver 1530 receives a signal from the one or more antennas 1535, extracts information from the received signal, and provides the extracted information to the processing system 1510, specifically the reception component 1402. In addition, the transceiver 1530 receives information from the processing system 1510, specifically the transmission component 1406, and generates a signal to be applied to the one or more antennas 1535 based at least in part on the received information.

The processing system 1510 includes a processor 1520 coupled to a computer-readable medium/memory 1525. The processor 1520 is responsible for general processing, including the execution of software stored on the computer-readable medium/memory 1525. The software, when executed by the processor 1520, causes the processing system 1510 to perform the various functions described herein for any particular apparatus. The computer-readable medium/memory 1525 may also be used for storing data that is manipulated by the processor 1520 when executing software. The processing system further includes at least one of the illustrated components. The components may be software modules running in the processor 1520, resident/stored in the computer-readable medium/memory 1525, one or more hardware modules coupled to the processor 1520, or some combination thereof.

In some aspects, the processing system 1510 may be a component of the base station 110 and may include the memory 242 and/or at least one of the TX MIMO processor 230, the RX processor 238, and/or the controller/processor 240. In some aspects, the apparatus 1505 for wireless communication includes means for determining that a first UE is to select a set of sidelink resources for a second UE in a selection window; and means for transmitting a request for the first UE to select the set of sidelink resources for the second UE in a selection window, wherein the selection window is of a length different than a length of a resource selection window of the first UE. The aforementioned means may be one or more of the aforementioned components of the apparatus 1400 and/or the processing system 1510 of the apparatus 1505 configured to perform the functions recited by the aforementioned means. As described elsewhere herein, the processing system 1510 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 15 is provided as an example. Other examples may differ from what is described in connection with FIG. 15.

Figure 16:
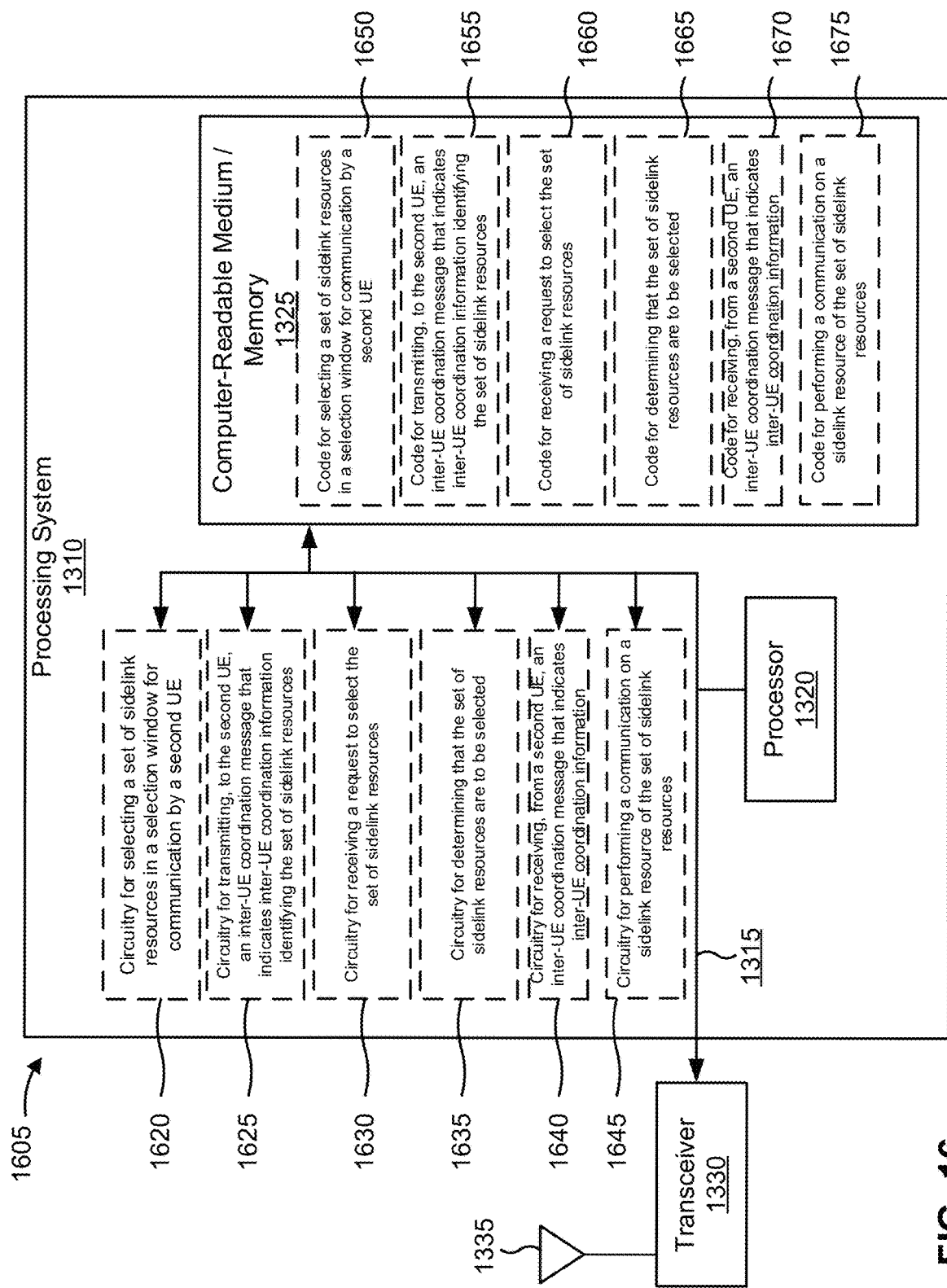
FIGS. 16-17 are diagrams illustrating examples of implementations of code and circuitry for an apparatus, in accordance with the present disclosure.

FIG. 16 is a diagram illustrating an example 1600 of an implementation of code and circuitry for an apparatus 1605. The apparatus 1605 may be a UE.

As further shown in FIG. 16, the apparatus may include circuitry for selecting a set of sidelink resources in a selection window for communication by a second UE (circuitry 1620). For example, the apparatus may include circuitry to enable the apparatus to select a set of sidelink resources in a selection window for communication by a second UE.

As further shown in FIG. 16, the apparatus may include circuitry for transmitting, to the second UE, an inter-UE coordination message that indicates inter-UE coordination information identifying the set of sidelink resources (circuitry 1625). For example, the apparatus may include circuitry to enable the apparatus to transmit, to the second UE, an inter-UE coordination message that indicates inter-UE coordination information identifying the set of sidelink resources.

As further shown in FIG. 16, the apparatus may include circuitry for receiving a request to select the set of sidelink resources (circuitry 1630). For example, the apparatus may include circuitry to enable the apparatus to receive a request to select the set of sidelink resources.

As further shown in FIG. 16, the apparatus may include circuitry for determining that the set of sidelink resources are to be selected (circuitry 1635). For example, the apparatus may include circuitry to enable the apparatus to determine that the set of sidelink resources are to be selected.

As further shown in FIG. 16, the apparatus may include circuitry for receiving, from a second UE, an inter-UE coordination message that indicates inter-UE coordination information (circuitry 1640). For example, the apparatus may include circuitry to enable the apparatus to receive, from a second UE, an inter-UE coordination message that indicates inter-UE coordination information.

As further shown in FIG. 16, the apparatus may include circuitry for performing a communication on a sidelink resource of the set of sidelink resources (circuitry 1645). For example, the apparatus may include circuitry to enable the apparatus to perform a communication on a sidelink resource of the set of sidelink resources.

As further shown in FIG. 16, the apparatus may include, stored in computer-readable medium 1325, code for selecting a set of sidelink resources in a selection window for communication by a second UE (code 1650). For example, the apparatus may include code that, when executed by the processor 1320, may cause the processor 1320 to select a set of sidelink resources in a selection window for communication by a second UE.

As further shown in FIG. 16, the apparatus may include, stored in computer-readable medium 1325, code for transmitting, to the second UE, an inter-UE coordination message that indicates inter-UE coordination information identifying the set of sidelink resources (code 1655). For example, the apparatus may include code that, when executed by the processor 1320, may cause the transceiver 1330 to transmit, to the second UE, an inter-UE coordination message that indicates inter-UE coordination information identifying the set of sidelink resources.

As further shown in FIG. 16, the apparatus may include, stored in computer-readable medium 1325, code for receiving a request to select the set of sidelink resources (code 1660). For example, the apparatus may include code that, when executed by the processor 1320, may cause the processor 1320 to receive a request to select the set of sidelink resources.

As further shown in FIG. 16, the apparatus may include, stored in computer-readable medium 1325, code for determining that the set of sidelink resources are to be selected (code 1665). For example, the apparatus may include code that, when executed by the processor 1320, may cause the processor 1320 to cause the transceiver 1330 to determine that the set of sidelink resources are to be selected.

As further shown in FIG. 16, the apparatus may include, stored in computer-readable medium 1325, code for receiving, from a second UE, an inter-UE coordination message that indicates inter-UE coordination information (code 1670). For example, the apparatus may include code that, when executed by the processor 1320, may cause the processor 1320 to receive, from a second UE, an inter-UE coordination message that indicates inter-UE coordination information.

As further shown in FIG. 16, the apparatus may include, stored in computer-readable medium 1325, code for performing a communication on a sidelink resource of the set of sidelink resources (code 1675). For example, the apparatus may include code that, when executed by the processor 1320, may cause the processor 1320 to cause transceiver 1330 to perform a communication on a sidelink resource of the set of sidelink resources.

FIG. 16 is provided as an example. Other examples may differ from what is described in connection with FIG. 16.

Figure 17:
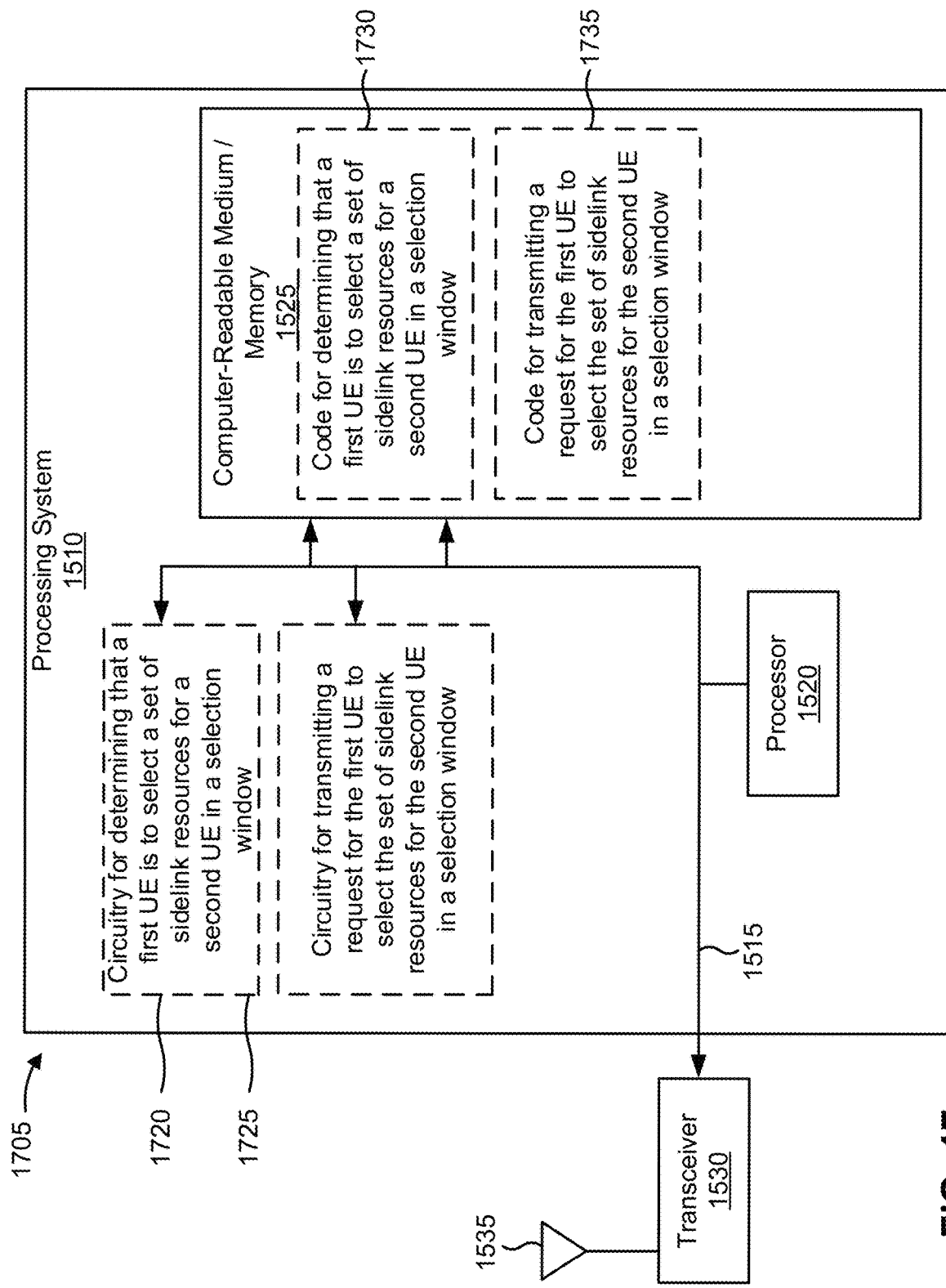

FIG. 17 is a diagram illustrating an example 1700 of an implementation of code and circuitry for an apparatus 1705. The apparatus 1705 may be a base station.

As further shown in FIG. 17, the apparatus may include circuitry for determining that a first UE is to select a set of sidelink resources for a second UE in a selection window (circuitry 1720). For example, the apparatus may include circuitry to enable the apparatus to determine that a first UE is to select a set of sidelink resources for a second UE in a selection window.

As further shown in FIG. 17, the apparatus may include circuitry for transmitting a request for the first UE to select the set of sidelink resources for the second UE in a selection window (circuitry 1725). For example, the apparatus may include circuitry to enable the apparatus to transmit a request for the first UE to select the set of sidelink resources for the second UE in a selection window.

As further shown in FIG. 17, the apparatus may include, stored in computer-readable medium 1525, code for determining that a first UE is to select a set of sidelink resources for a second UE in a selection window (code 1730). For example, the apparatus may include code that, when executed by the processor 1520, may cause the processor 1520 to determine that a first UE is to select a set of sidelink resources for a second UE in a selection window.

As further shown in FIG. 17, the apparatus may include, stored in computer-readable medium 1525, code for transmitting a request for the first UE to select the set of sidelink resources for the second UE in a selection window (code 1735). For example, the apparatus may include code that, when executed by the processor 1520, may cause the transceiver 1530 to transmit a request for the first UE to select the set of sidelink resources for the second UE in a selection window.

FIG. 17 is provided as an example. Other examples may differ from what is described in connection with FIG. 17.

The following provides an overview of some Aspects of the present disclosure:

Aspect 1: A method of wireless communication performed by a first user equipment (UE), comprising: selecting a set of sidelink resources in a selection window for communication by a second UE, wherein a length of the selection window is different than a length of a resource selection window of the first UE; and transmitting, to the second UE, an inter-UE coordination message that indicates inter-UE coordination information identifying the set of sidelink resources.

Aspect 2: The method of Aspect 1, wherein the set of sidelink resources is a set of available sidelink resources.

Aspect 3: The method of any of Aspects 1-2, wherein the set of sidelink resources is a set of unavailable sidelink resources.

Aspect 4: The method of any of Aspects 1-3, wherein the selection window is independent of the resource selection window of the first UE.

Aspect 5: The method of any of Aspects 1-4, wherein the length of the selection window is a fixed length.

Aspect 6: The method of Aspect 5, wherein the fixed length is equal to a maximum time duration for reserving sidelink resources.

Aspect 7: The method of any of Aspects 1-6, wherein the length of the selection window is associated with a resource pool of the set of sidelink resources.

Aspect 8: The method of any of Aspects 1-7, wherein the length of the selection window is associated with a carrier associated with the set of sidelink resources.

Aspect 9: The method of any of Aspects 1-8, wherein the selection window is configured using semi-static signaling.

Aspect 10: The method of any of Aspects 1-9, wherein the selection window is based at least in part on at least one of: a cast type of traffic associated with the selection window, a packet delay budget of the traffic, or a priority of the traffic.

Aspect 11: The method of any of Aspects 1-10, further comprising: receiving a request to select the set of sidelink resources, wherein the request indicates the length of the selection window or a time associated with the selection window.

Aspect 12: The method of Aspect 11, wherein the length of the selection window is based at least in part on whether the request is received from the second UE, a base station, or a relay associated with a base station.

Aspect 13: The method of any of Aspects 1-12, wherein the selection window is defined based at least in part on a fixed gap between a reporting channel on which the inter-UE coordination message is transmitted and a start of the selection window.

Aspect 14: The method of any of Aspects 1-13, further comprising: receiving a request to select the set of sidelink resources, wherein the inter-UE coordination message is transmitted after a minimum time gap from an end of a channel carrying the request.

Aspect 15: The method of Aspect 14, wherein the minimum time gap is based at least in part on receiving the request from a base station or the second UE.

Aspect 16: The method of any of Aspects 1-15, further comprising: determining that the set of sidelink resources are to be selected, wherein the inter-UE coordination message is transmitted after a minimum time gap based at least in part on a time associated with the determination that the set of sidelink resources are to be selected.

Aspect 17: The method of Aspect 16, wherein the inter-UE coordination message is transmitted in a first available resource after the minimum time gap.

Aspect 18: A method of wireless communication performed by a base station, comprising: determining that a first user equipment (UE) is to select a set of sidelink resources for a second UE in a selection window, wherein a length of the selection window is different than a length of a resource selection window of the first UE; and transmitting a request for the first UE to select the set of sidelink resources for the second UE in the selection window.

Aspect 19: The method of Aspect 18, wherein the selection window is independent of the resource selection window of the first UE.

Aspect 20: The method of any of Aspects 18-19, wherein the request indicates the selection window.

Aspect 21: The method of any of Aspects 18-20, wherein the selection window is of a fixed length equal to a maximum time duration for reserving sidelink resources.

Aspect 22: The method of any of Aspects 18-21, wherein the length of the selection window is associated with a resource pool of the set of sidelink resources.

Aspect 23: The method of any of Aspects 18-22, wherein the length of the selection window is associated with a carrier associated with the set of sidelink resources.

Aspect 24: The method of any of Aspects 18-23, wherein the set of sidelink resources are reported using an inter-UE coordination message that is transmitted after a minimum time gap from an end of a channel carrying the request.

Aspect 25: A method of wireless communication performed by a first user equipment (UE), comprising: receiving, from a second UE, an inter-UE coordination message that indicates inter-UE coordination information identifying a set of sidelink resources in a selection window for communication by the first UE; and performing a communication on a sidelink resource of the set of sidelink resources based at least in part on a determination of a location of the selection window.

Aspect 26: The method of Aspect 25, further comprising: transmitting a request to select the set of sidelink resources, wherein the request indicates a length of the selection window or the location of the selection window.

Aspect 27: The method of any of Aspects 25-26, wherein the location of the selection window is based at least in part on a fixed gap between a reporting channel on which the inter-UE coordination message is received and a start of the selection window.

Aspect 28: The method of any of Aspects 25-27, further comprising: transmitting a request to select the set of sidelink resources, wherein the inter-UE coordination message is received after a minimum time gap from an end of a channel carrying the request.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
   one or more memories; and
   one or more processors, coupled to the one or more memories, configured to:
      select a set of sidelink resources in a selection window in which the first UE selects resources for inter-UE coordination operations,
         wherein the set of sidelink resources is selected by the first UE for communication by a second UE, and
         wherein the selection window is for multiple UEs that include at least the second UE and a third UE;
      receive a request for resources from the second UE and a request for resources from the third UE;
      transmit, to the second UE, an inter-UE coordination message that indicates inter-UE coordination information identifying the set of sidelink resources, wherein the one or more processors are configured to transmit the inter-UE coordination message after a minimum time gap from reception of the request for resources from the second UE and the request for resources from the third UE; and
      transmit reporting to the third UE after the minimum time gap.

2. The apparatus of claim 1, wherein the set of sidelink resources is a set of available sidelink resources.

3. The apparatus of claim 1, wherein the set of sidelink resources is a set of unavailable sidelink resources.

4. The apparatus of claim 1, wherein the selection window is selected or determined independent of a resource selection window of the first UE.

5. The apparatus of claim 1, wherein a length of the selection window is a fixed length.

6. The apparatus of claim 5, wherein the fixed length is equal to a maximum time duration for reserving sidelink resources.

7. The apparatus of claim 1, wherein a length of the selection window is associated with a resource pool of the set of sidelink resources.

8. The apparatus of claim 1, wherein a length of the selection window is associated with a carrier associated with the set of sidelink resources.

9. The apparatus of claim 1, wherein the selection window is configured using semi-static signaling.

10. The apparatus of claim 1, wherein the selection window is based at least in part on at least one of:
   a cast type of traffic associated with the selection window,
   a packet delay budget of the traffic, or
   a priority of the traffic.

11. The apparatus of claim 1,
   wherein the request for resources from the second UE or the request for resources from the third UE indicates a length of the selection window or a time associated with the selection window.

12. The apparatus of claim 11, wherein the length of the selection window is based at least in part on whether the request is received via the second UE, a base station, or a relay associated with a base station.

13. The apparatus of claim 1, wherein the selection window is defined based at least in part on a time gap from the inter-UE coordination message.

14. The apparatus of claim 1, wherein the one or more processors are further configured to:
transmit the inter-UE coordination message after the minimum time gap from an end of a channel carrying the request for resources from the second UE and the request for resources from the third UE.

15. The apparatus of claim 14, wherein the minimum time gap is based at least in part on receiving the request via a base station or the second UE.

16. The apparatus of claim 1, wherein the one or more processors are further configured to:
determine that the set of sidelink resources is to be selected, wherein one or more processors are configured to transmit the inter-UE coordination message after the minimum time gap is based at least in part on a time associated with the determination that the set of sidelink resources are to be selected.

17. The apparatus of claim 1, wherein the one or more processors are configured to transmit the inter-UE coordination message in a first available resource after the minimum time gap.

18. An apparatus for wireless communication at a first user equipment (UE), comprising:
one or more memories; and
one or more processors, coupled to the one or more memories, configured to:
transmit, to a second UE, a request for resources; and
receive, from the second UE, an inter-UE coordination message that indicates inter-UE coordination information identifying a set of sidelink resources, in a selection window in which the second UE selects resources for inter-UE coordination operations, for communication by the first UE,
wherein the selection window is for multiple UEs that include at least the first UE and a third UE,
wherein the one or more processors are configured to receive the inter-UE coordination message after a minimum time gap from transmitting the request for resources, and
wherein transmission of reporting to the third UE occurs after the minimum time gap; and
perform a communication on a sidelink resource of the set of sidelink resources based at least in part on a determination of a location of the selection window.

19. The apparatus of claim 18,
wherein the request for resources indicates a length of the selection window or the location of the selection window.

20. The apparatus of claim 18,
wherein the inter-UE coordination message is received after the minimum time gap from an end of a channel carrying the request for resources.

21. A method of wireless communication performed by a first user equipment (UE), comprising:
selecting a set of sidelink resources in a selection window in which the first UE selects resources for inter-UE coordination operations,
wherein the set of sidelink resources is selected by the first UE for communication by a second UE, and
wherein the selection window is for multiple UEs that include at least the second UE and a third UE;
receiving a request for resources from the second UE and a request for resources from the third UE;
transmitting, to the second UE, an inter-UE coordination message that indicates inter-UE coordination information identifying the set of sidelink resources, wherein the inter-UE coordination message is transmitted after a minimum time gap from receiving the request for resources from the second UE and the request for resources from the third UE; and
transmitting reporting to the third UE after the minimum time gap.

22. The method of claim 21, wherein the set of sidelink resources is a set of available sidelink resources.

23. The method of claim 21, wherein the set of sidelink resources is a set of unavailable sidelink resources.

24. The method of claim 21, wherein the selection window is selected or determined independent of a resource selection window of the first UE.

25. The method of claim 21, wherein a length of the selection window is a fixed length.

26. The method of claim 25, wherein the fixed length is equal to a maximum time duration for reserving sidelink resources.

27. The method of claim 21, wherein a length of the selection window is associated with a resource pool of the set of sidelink resources.

28. The method of claim 21, wherein a length of the selection window is associated with a carrier associated with the set of sidelink resources.

29. The method of claim 21, wherein the selection window is configured using semi-static signaling.

30. A method of wireless communication performed by a first user equipment (UE), comprising:
transmitting, to a second UE, a request for resources; and
receiving, from the second UE, an inter-UE coordination message that indicates inter-UE coordination information identifying a set of sidelink resources, in a selection window in which the second UE selects resources for inter-UE coordination operations, for communication by the first UE,
wherein the selection window is for multiple UEs that include at least the first UE and a third UE,
wherein the inter-UE coordination message is received after a minimum time gap from transmitting the request for resources, and
wherein transmission of reporting to the third UE occurs after the minimum time gap; and
performing a communication on a sidelink resource of the set of sidelink resources based at least in part on a determination of a location of the selection window.

* * * * *